US012578249B1

(12) United States Patent (10) Patent No.: US 12,578,249 B1

Fard et al. (45) Date of Patent: Mar. 17, 2026

(54) AUGMENTED REALITY WAVEGUIDE AND DISPLAY LIGHT ENGINE METROLOGY

(71) Applicant: Amazon Technologies, Inc., Seattle, WA (US)

(72) Inventors: Erfan Fard, Tucson, AZ (US); Shengtong Chen, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 73 days.

(21) Appl. No.: 18/492,356

(22) Filed: Oct. 23, 2023

(51) Int. Cl.
| | |
|---|---|
| *G01M 11/02* | (2006.01) |
| *G01B 11/27* | (2006.01) |

(52) U.S. Cl.
CPC ....... *G01M 11/0228* (2013.01); *G01B 11/272* (2013.01); *G01M 11/0207* (2013.01)

(58) Field of Classification Search
CPC .......................... G01B 11/272; G01M 11/0207
See application file for complete search history.

(56) References Cited

U.S. PATENT DOCUMENTS

2019/0155021 A1 * 5/2019 Wall ..................... G02B 26/121

* cited by examiner

*Primary Examiner* — Thanh Luu
(74) *Attorney, Agent, or Firm* — Kilpatrick Townsend & Stockton LLP

(57) ABSTRACT

Techniques for augmented reality waveguide and display light engine metrology are described. In an example, a computer system causes a display light engine to emit first light from a first group of pixels of the display light engine. The computer system determines a first measurement value associated with the first light after the first light is extracted from an optical waveguide. The computer system causes the display light engine to emit second light from a second group of pixels of the display light engine. The second group is different from the first group. The computer system determines a second measurement value associated with the second light after the second light is extracted from the optical waveguide. The computer system generates, based on the first measurement value and the second measurement value, a metrology measurement indicating a property of the optical waveguide.

20 Claims, 19 Drawing Sheets

1502
Assign a uniformity measurement per pixel group to display section

1504
Compare the uniformity measurement of a display section to a threshold

1506
Greater than threshold?

Y

N

1508
Add display section identifier to FOV set

1510
Do not add display section identifier to FOV set

1512
Determine a set of display section identifiers added to the FOV set

Optical
System <u>1900</u>

AUGMENTED REALITY WAVEGUIDE AND DISPLAY LIGHT ENGINE METROLOGY

BACKGROUND

Image displays have been utilized in different mixed reality systems such as augmented reality systems that include near eye displays and heads-up displays. In a mixed reality system, an image can be displayed to a user from a light projector onto a light transparent display that allows the user to also view the real world.

BRIEF DESCRIPTION OF THE DRAWINGS

Various embodiments in accordance with the present disclosure will be described with reference to the drawings, in which.

DETAILED DESCRIPTION

Figure 1:
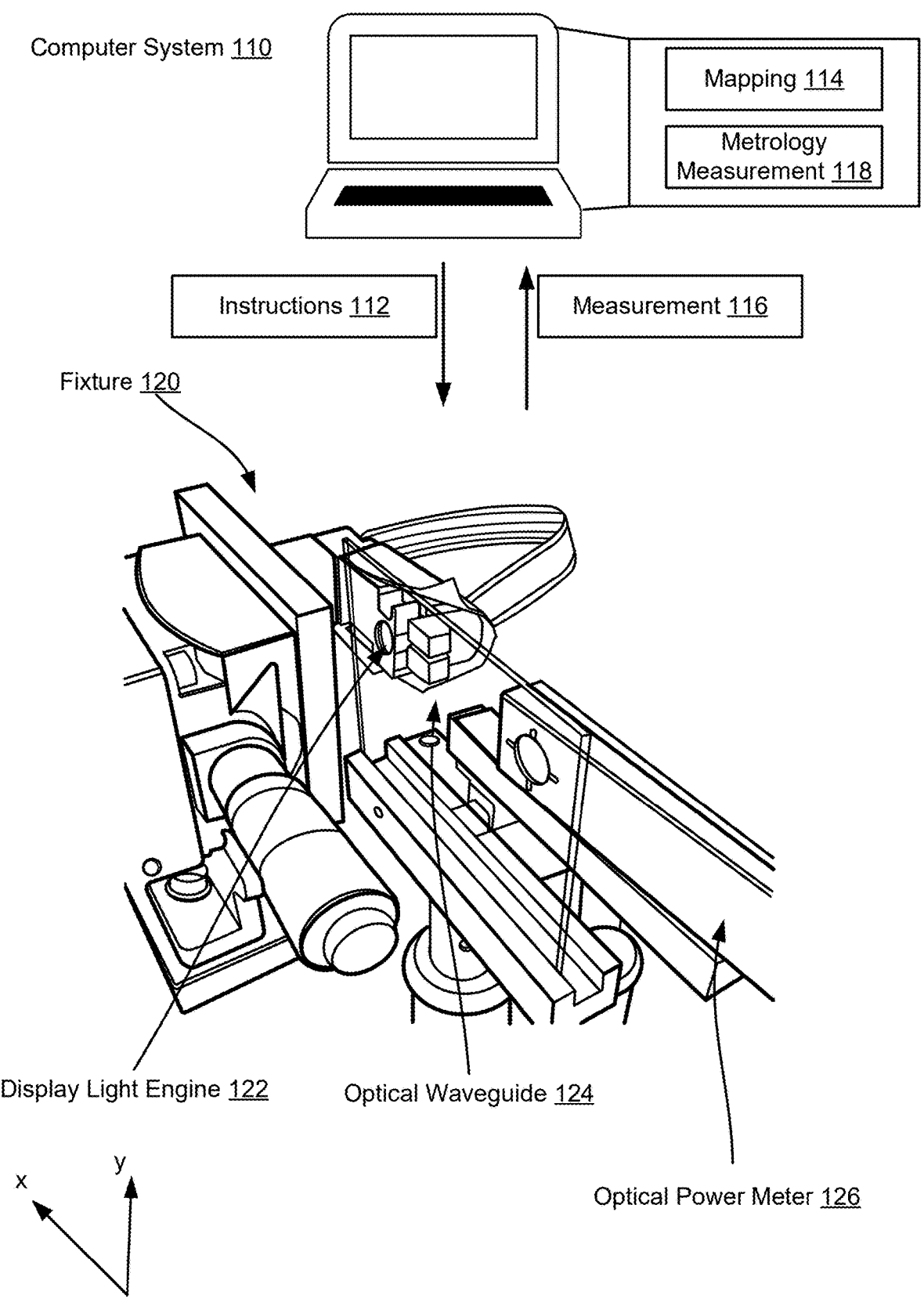
FIG. 1 illustrates an example of a system for augmented reality waveguide and display light engine metrology, in accordance with an embodiment of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, augmented reality waveguide and display light engine metrology. In an example, a display light engine and an optical waveguide can be components of an augmented reality (AR) device. Prior to installation, these components can be optically characterized such that fine tuning can be achieved to optimize the optical performance. As part of the optical characterization, a power meter can be used. In particular, the power meter measures light extracted from the optical waveguide, where the light is originally emitted from the display light engine towards the waveguide. A computer system can control light emissions from the display light engine such that light is emitted sequentially or concurrently from groups of pixels of the display light engine. The computer system can also be coupled to the power meter and receive the measurements corresponding to the light emissions. The computer system can process these measurements according to a metrology analysis (e.g., to determine a uniformity of light extraction from the optical waveguide and/or a target alignment of the display light engine relative to the optical waveguide that maximizes the optical efficiency). In this way, pixel groups and the power meter can be used for the optical characterization, thereby avoiding complex test equipment and procedures.

To illustrate, consider an example of determining uniformity and alignment. Initially, a computer system can include a test file defining pixel groups. For instance, the test file specifies nine pixel groups arranged in three rows and three columns, with a particular pitch between the groups. While the display light engine is maintained at a first position relative to the optical waveguide, the computer system can instruct the display light engine to emit light at a particular wavelength sequentially from the pixel groups, beginning at the top left pixel group. For each pixel group, an optical power meter coupled to the computer system measures a power of the corresponding light extracted from the waveguide. The power measurement for a pixel group can be associated with a section of the display light engine. The ratio between the smallest power measurement and the maximum power measurement across the sections can be set as a uniformity measurement of the display light engine at that wavelength and position. In addition, the computer system can instruct the display light engine to emit light from each of the pixel groups at different wavelengths corresponding to different color channels (e.g., red, green, and blue), resulting in a uniformity measurement per color channel. A uniformity of the light extraction can be defined as an average (or some other statistical measurement) of the uniformity measurements across the color channels. Furthermore, the display light engine may be repositioned relative to the display light engine and the measurements can be repeated to define a uniformity per position. Then, the computer system can determine the position that provides the best uniformity (e.g., the one having the largest value). For installation in an AR device, the display light engine can be aligned relative to the optical waveguide according to this position.

Embodiments of the present disclosure provide several technical advantages over conventional optical waveguide systems. For instance, conventional near-eye displays (NEDs) may suffer from low efficiency meaning that the ratio of the amount of light output from the NED to the power in is low (e.g., a percentage of the power in is output). The system of the present disclosure provides a means to determine a target alignment of a display light engine relative to an optical waveguide to maximize the uniformity and efficiency of the light output by performing measurements using an optical power meter. Conventional approaches use a camera to capture images of a fully lit display light engine in multiple positions relative to an optical waveguide. But using the display light engine and the optical power meter of the present disclosure can shorten the data capture and processing time and significantly reduce the complexity of the test equipment. As a result, overall throughput of the test system may be increased.

As used herein, the terms "light" and "optical" are used in their customary ordinary meaning and refer to electromagnetic wave having a wavelength within the visible region of the optical spectrum and, optionally, within a region that neighbors the visible region (a flanking region). Also as used herein, the term "hologram" is used in their customary ordinary meaning and refers to a diffraction pattern-produced by a spatially split coherent beam of radiation (such as a laser beam) in a layer of an optical material. The term "holographic layer" refers to a layer of material containing a hologram recorded therein (in a body or thickness of the layer) and/or as a surface modulation (surface relief) of such layer.

FIG. 1 illustrates an example of a system for augmented reality waveguide and display light engine metrology, in accordance with an embodiment of the disclosure. The system may be used to characterize an optical waveguide 124 so that the optical waveguide 124 can be positioned and aligned with a display light engine 122 in a manner that is expected to result in a maximum image uniformity and/or efficiency.

A fixture 120 includes the display light engine 122, which is optically coupled to the optical waveguide 124. The display light engine 122 can be optically coupled to an injection holographic layer of the optical waveguide 124. In addition, the optical waveguide 124 can be optically coupled to an optical power meter 126. An extraction holographic layer of the optical waveguide 124 can be coupled to the optical power meter 126.

The fixture 120, the display light engine 122, and the optical power meter 126 are communicatively coupled to a computer system 110. The computer system 110 can send instructions 112 to the display light engine 122 to cause the display light engine 122 to emit light. The instructions 112 can control which pixels of the display light engine 122 are to emit light at a given time. The instructions 112 can also indicate a wavelength at which the display light engine 122 is to emit the light. The pixels of the display light engine 122 may be sectioned into display sections. In each display section, a pixel group is defined. The pixel group can be as big as the display section but is generally smaller than the display section so that there is a pitch between adjacent pixel groups. The size of the set of the pixel groups can be based on a test resolution associated with generating a metrology measurement. That is, for a nine-point test, nine pixel groups can be used in the set of pixel groups. In addition, the size of each pixel group can be based on a sensitivity of the optical power meter 126.

The computer system 110 can store, in a test file, a mapping 114 of pixel groups to display sections, and the mapping 114 can also indicate the pixels in each pixel group. So, the instructions 112 can indicate a pixel group to the display light engine 122 based on the mapping. The pixel group indication can be a group number or location associated with the pixel group. The display light engine 122 can be programmed to translate the group number or location to the specific pixels of the pixel group. Alternatively, the instructions 112 may identify the specific pixels to turn on.

The light emitted by the display light engine 122 propagates from the injection holographic layer to the extraction layer according to total internal reflection (TIR) within the optical waveguide 124. The optical power meter 126 receives the light from the extraction holographic layer and determines a measurement 116 of the light. For instance, the optical power meter 126 may be a photodetector or thermal sensor that determines a power measurement value associated with extracted light. As used herein, power measurement of light refers to a power measurement value associated with the light, where such value can characterize a power property of the light, such as its wattage and/or luminescence. The photodetector can be coupled to a photopic filter so that the optical power meter 126 may determine a luminance measurement of the extracted light. Otherwise, wattage is determined. The optical power meter 126 can send the measurement 116 to the computer system 110.

The display light engine 122 may be instructed to sequentially emit light from different pixel groups at the same wavelength. The optical power meter 126 can determine a measurement for each pixel group. The computer system 110 can generate a metrology measurement 118 indicating a property of the optical waveguide 124. For example, the property may be a uniformity of light extraction from the optical waveguide 124 or an alignment characterization of the optical waveguide 124 and the display light engine 122. With the display light engine 122 and the optical waveguide 124 at a same position relative to each other, the same pixel groups may also emit light at a different wavelength. The computer system 110 can determine a uniformity corresponding to the different wavelengths. The uniformities of the two (or more) wavelengths can be combined to determine an overall uniformity of the optical waveguide 124 associated with the position.

In an example, one set of measurement readings can take $n_{frame}$/(frames per second), which is the number of frames (e.g., thirty five) divided by the frames per second (fps) of the display light engine 122. Accordingly, the speed of a metrology measurement for the optical waveguide 124 is determined by the frame rate (e.g., one-hundred twenty fps or two-hundred forty fps) of the display light engine 122 and the data acquisition time of the optical power meter 126 (e.g., less than one millisecond). Using the display light engine 122 and the optical power meter 126 to generate the metrology measurement 118 of the optical waveguide 124 can shorten the data capture and processing time and enable identifying an optimal alignment for the display light engine 122 relative to the optical waveguide 124 in position space. The position space has four degrees of freedom including a position of the display light engine 122 relative to the optical waveguide 124 along an x-axis (x), a position of the display light engine 122 relative to the optical waveguide 124 along a y-axis (y), a rotation of the display light engine 122 relative to the optical waveguide 124 about the x-axis (a), and a rotation of the display light engine 122 relative to the optical waveguide 124 about the y-axis (B).

Figure 2:
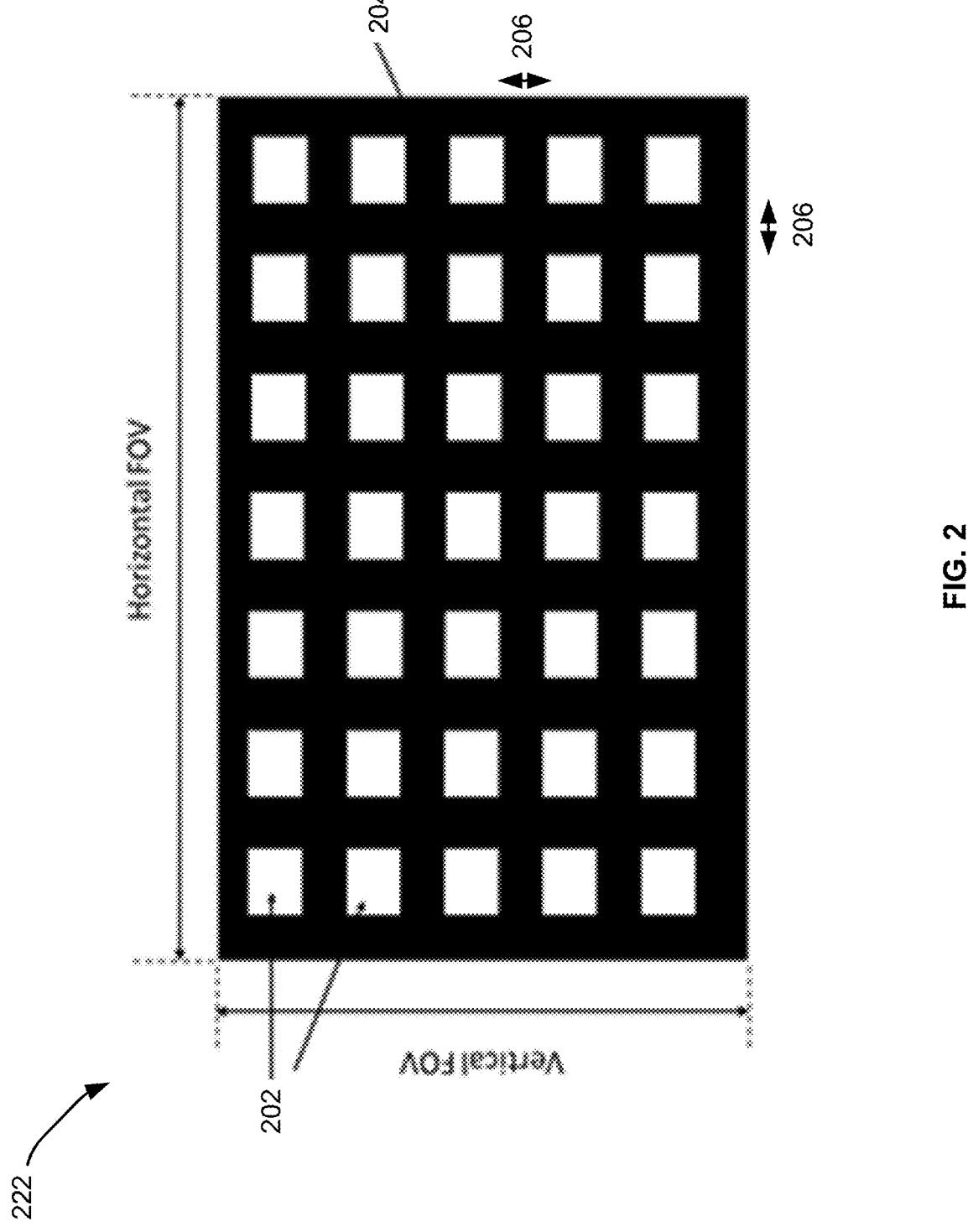
FIG. 2 illustrates an example of a display light engine having pixel groups, in accordance with an embodiment of the disclosure.

FIG. 2 illustrates an example of a display light engine 222 having pixel groups, in accordance with an embodiment of the disclosure. The display light engine 222 is an example of the display light engine 122 in FIG. 1. The display light engine 222 includes pixel groups 202, which are groups of pixels configured to emit light. Each pixel group 202 is part of a display section of the display light engine 222. In some cases, each pixel of the display light engine 222 is part of a pixel group 202 and emits light. But the display light engine 222 in FIG. 2 also includes inactive pixels 204, which are pixels of the pixel groups 204 that remain off and do not emit light. The inactive pixels 204 are also part of the display sections. The pixel groups 202 are non-overlapping, so there is a pitch 206 between adjacent pixel groups 202. The pitch between adjacent horizontal pixel groups 202 may be the same or different from the pitch between adjacent vertical pixel groups 202.

The display light engine 222 of FIG. 2 includes thirty-five pixel groups, with seven pixel groups along a horizontal field of view and five along a vertical field of view. Other examples may involve more or fewer pixel groups and may be based on a test resolution associated with generating a metrology measurement of an optical waveguide (e.g., optical waveguide 124 in FIG. 1). So, the display light engine 222 may be used for a test involving thirty-five test points. In addition, the size of each pixel group can be based on a sensitivity of the optical power meter. So, an optical power meter with a lower sensitivity may result in using a display light engine with fewer but larger pixel groups.

As described in FIG. 1, a computer system can control the emission of light by the pixel groups 202 of the display light engine 222 into an optical waveguide and determine measurements associated with the optical waveguide based on extracted light from the optical waveguide. Since each pixel group 202 is contained within a display section, a measurement generated from the light of a given pixel group is associated with the pixel group, the display section, and a wavelength of the light.

Figure 3:
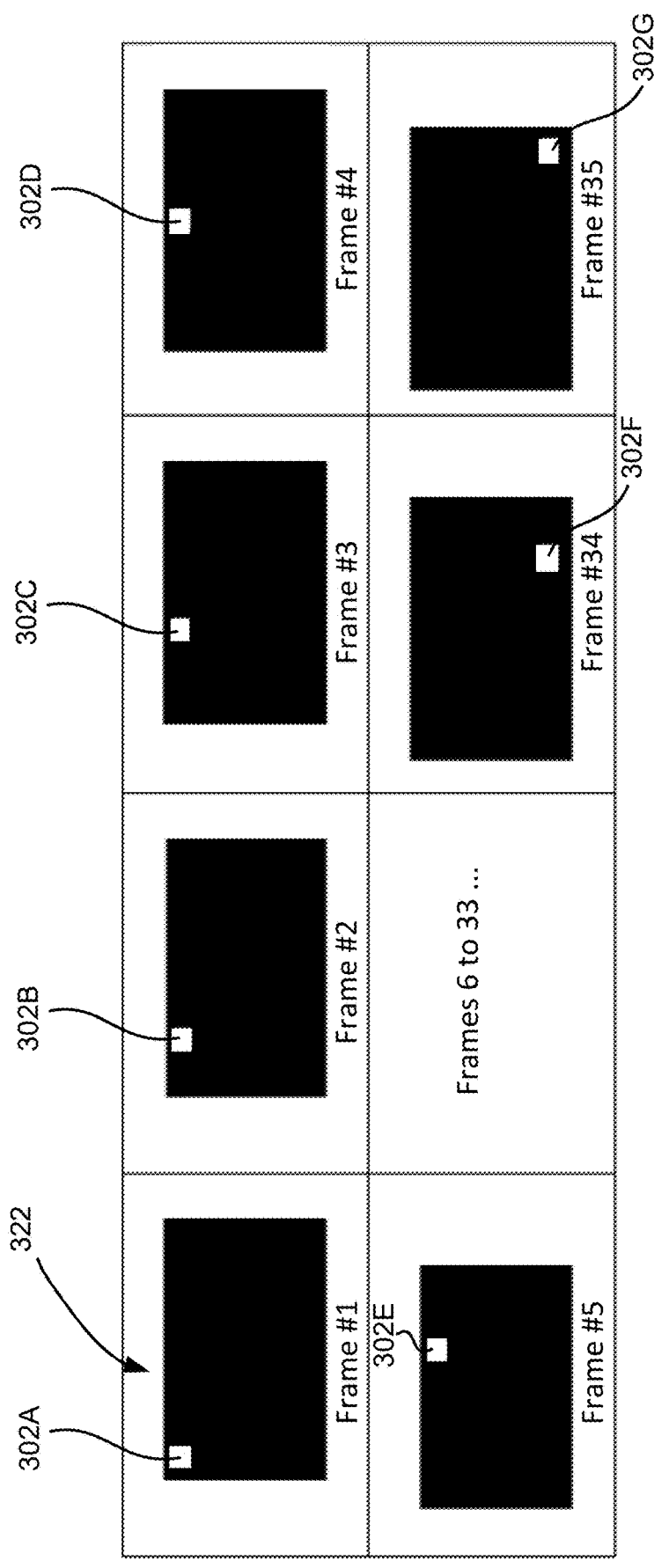
FIG. 3 illustrates example frames of sequentially activating pixel groups of a display light engine 322, in accordance with an embodiment of the disclosure.

FIG. 3 illustrates example frames of sequentially activating pixel groups of a display light engine 322, in accordance with an embodiment of the disclosure. The display light engine 322 can correspond to the display light engine 222 in FIG. 2, having thirty-five pixel groups. The display light engine 322 can be optically coupled to an optical waveguide (e.g., optical waveguide 124 in FIG. 1), which can be optically coupled to an optical power meter (e.g., optical power meter 126 in FIG. 1). Pixel groups 302A-302G of the display light engine 322 can be switched on sequentially and the output power from the optical waveguide can be measured using the optical power meter. Each pixel group 302A-302G corresponds to a frame. So, a first frame can correspond to pixel group 302A emitting light, a second frame can correspond to pixel group 302B emitting light, a third frame can correspond to pixel group 302C emitting light, and so on, where a thirty-fifth frame can correspond to pixel group 302G emitting light. The pixel group 302A can emit light at a first time, and the light can have a first wavelength (e.g., red). Each of the remaining pixel groups 302B-302G can emit light at different, sequential times (e.g., a second time, a third time, etc.), and the light emitted by each of the pixel groups 302B-302G can have the first wavelength.

Figure 4:
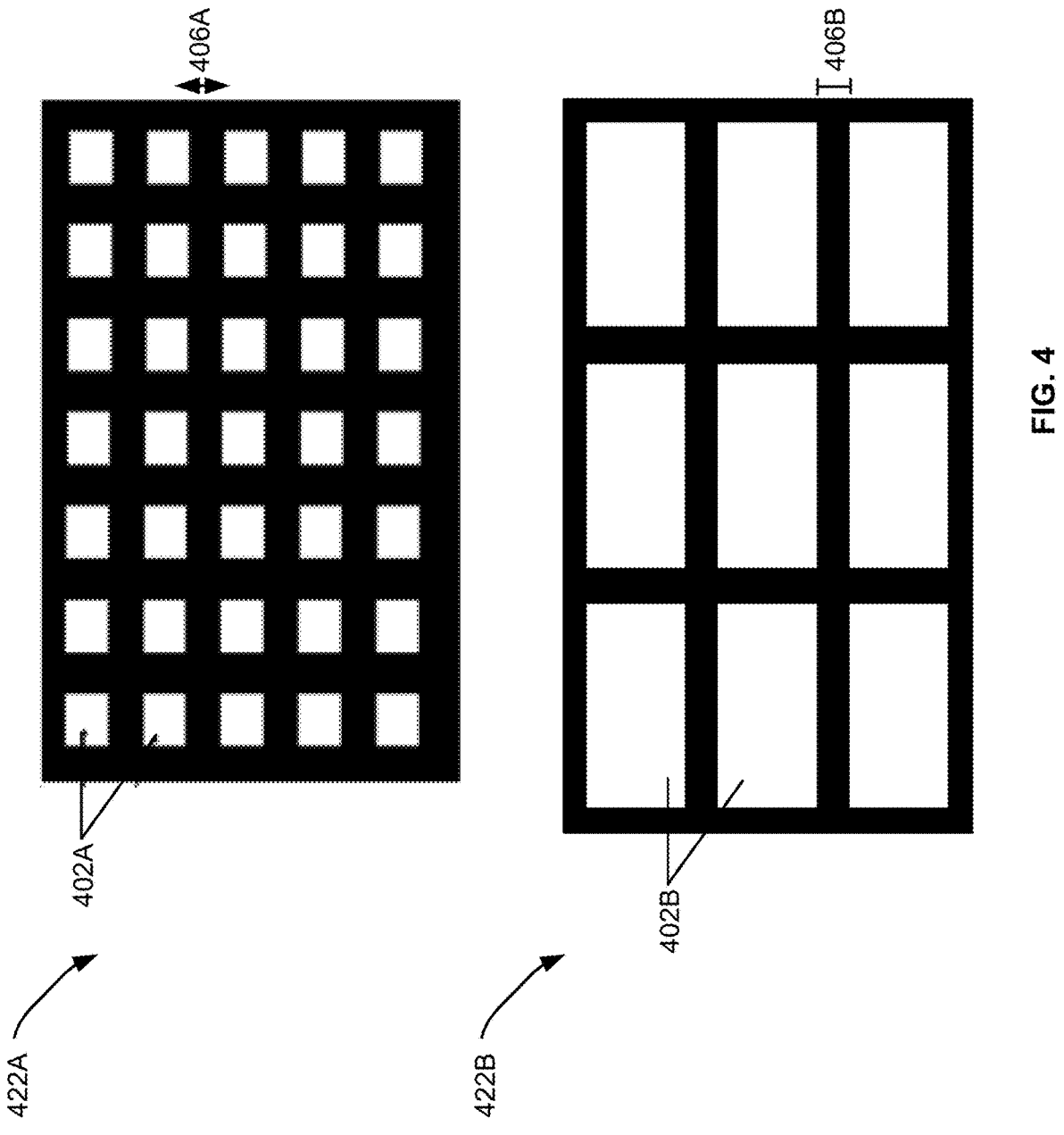
FIG. 4 illustrates example of display light engines with various pixel groups, in accordance with an embodiment of the disclosure.

FIG. 4 illustrates example of display light engines with various pixel groups, in accordance with an embodiment of the disclosure. Display light engine 422A corresponds to display light engine 222 in FIG. 2, with pixel groups 402A and a pitch 406A between the pixel groups 402A. The display light engine 422A includes thirty-five pixel groups.

In an example, display light engine 422B includes pixel groups 402B. Display light engine 422B includes nine pixel groups arranged in three rows and three columns, that are larger in both a horizontal and vertical direction than the pixel groups 402A. That is, the pixel groups 402B each include more pixels than the pixel groups 402A. In addition, the pitch 406A between the pixel groups 402A is larger than the pitch 406B between the pixel groups 402B. This means that there are more inactive pixels in the display light engine 422A than in the display light engine 422B.

Figure 5:
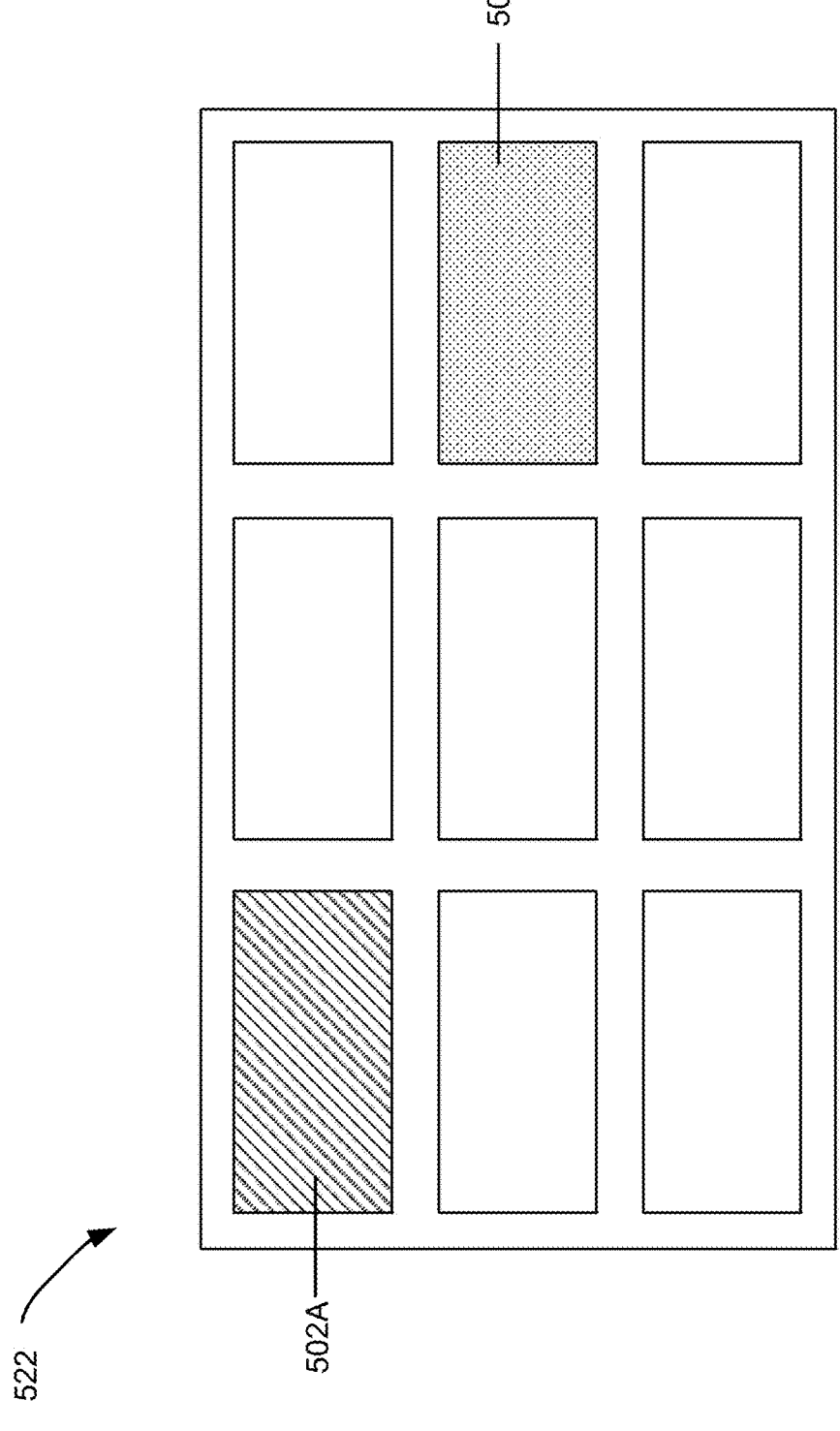
FIG. 5 illustrates an example of parallel light emission of a display light engine, in accordance with an embodiment of the disclosure.

FIG. 5 illustrates an example of parallel light emission of a display light engine 522, in accordance with an embodiment of the disclosure. The display light engine 522 includes nine pixel groups. A computer system (e.g., computer system 110 in FIG. 1) can cause the display light engine 522 to emit first light having a first wavelength (e.g., red) and to emit second light having a second wavelength (e.g., blue) at a same time. The computer system 110 can cause the display light engine 522 to emit the first light having the first wavelength by controlling a pixel group 502A to emit the first light. In addition, the computer system 110 can cause the display light engine 522 to emit the second light having the second wavelength by controlling a pixel group 502B to emit the second light. So, the pixel groups 502A-B are active at the same time.

Figure 6:
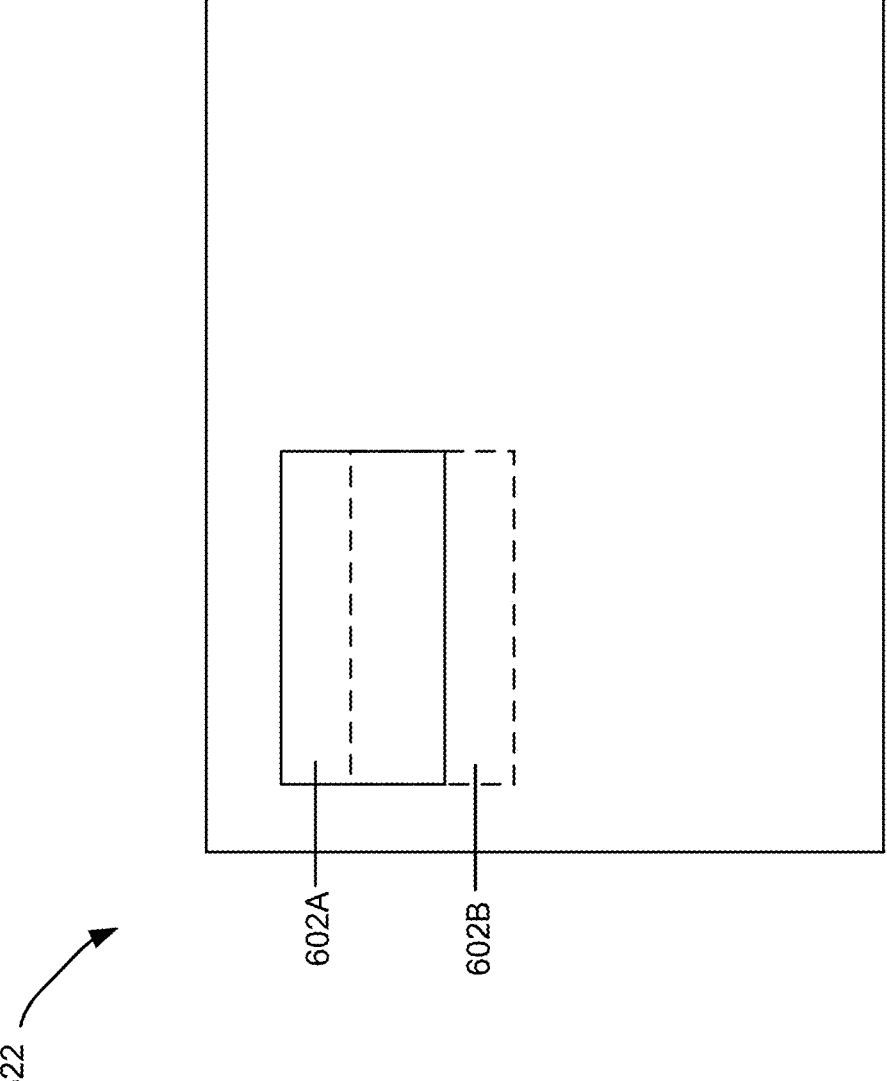
FIG. 6 illustrates an example of overlapping pixel groups of a display light engine, in accordance with an embodiment of the disclosure.

FIG. 6 illustrates an example of overlapping pixel groups of a display light engine 622, in accordance with an embodiment of the disclosure. The display light engine 622 includes a pixel group 602A that is partially overlapping with a pixel group 602B (shown by a dashed line). In this case, to generate measurements associated with an optical waveguide (e.g., optical waveguide 124 in FIG. 1) that is optically coupled to the display light engine 622, a computer system (e.g., computer system 110 in FIG. 1) can control the emission of light by the pixel groups 602A-602B of the display light engine 622 into the optical waveguide. Measurements associated with the optical waveguide can be determined from light emitted by each of the pixel groups 602A-602B. For instance, a first measurement associated with the optical waveguide can be determined based on extracted light emitted by the pixel group 602A. In addition, a second measurement associated with the optical waveguide can be determined based on extracted light emitted by the pixel group 602B. Since the pixel groups 602A-602B partially overlap, the measurement for a given pixel group is assigned to a reference point (e.g., the center, corner, etc.) of the pixel group. The reference point can be unique to a display section of the display light engine 622, so, the measurement can then be associated with that display section. When overlapping pixel groups are used, sequential light emission is typically used.

Figure 7:
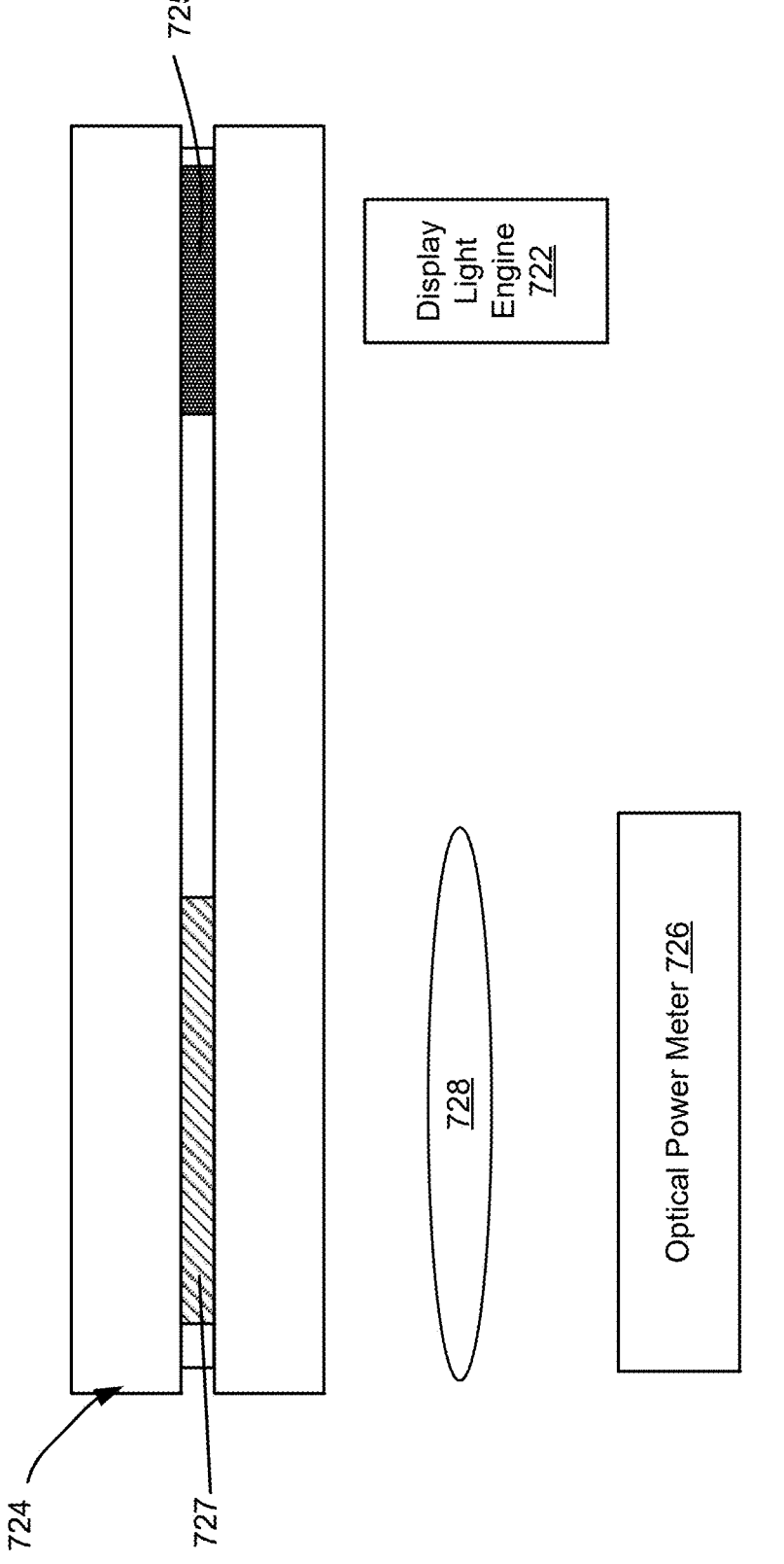
FIG. 7 illustrates an example of a top view of a measurement setup for waveguide metrology, in accordance with an embodiment of the disclosure.

FIG. 7 illustrates an example of a top view of a measurement setup for waveguide metrology, in accordance with an embodiment of the disclosure. A display light engine 722 is optically coupled to an optical waveguide 724, which is optically coupled to an optical power meter 726. The display light engine 722 can emit light towards an injection holographic layer 725 of the optical waveguide 724. The light can then propagate within the optical waveguide 724 by TIR towards an extraction holographic layer 727 of the optical waveguide 724, where the light is extracted. The extracted light propagates towards an optical lens 728 that is disposed between the extraction holographic layer 727 and the optical power meter 726. A focal point of the optical lens 728 can be on a surface of the optical power meter 726. The optical power meter 726 receives the extracted light and generates a measurement (e.g., a power measurement) of the extracted light.

Figure 8:
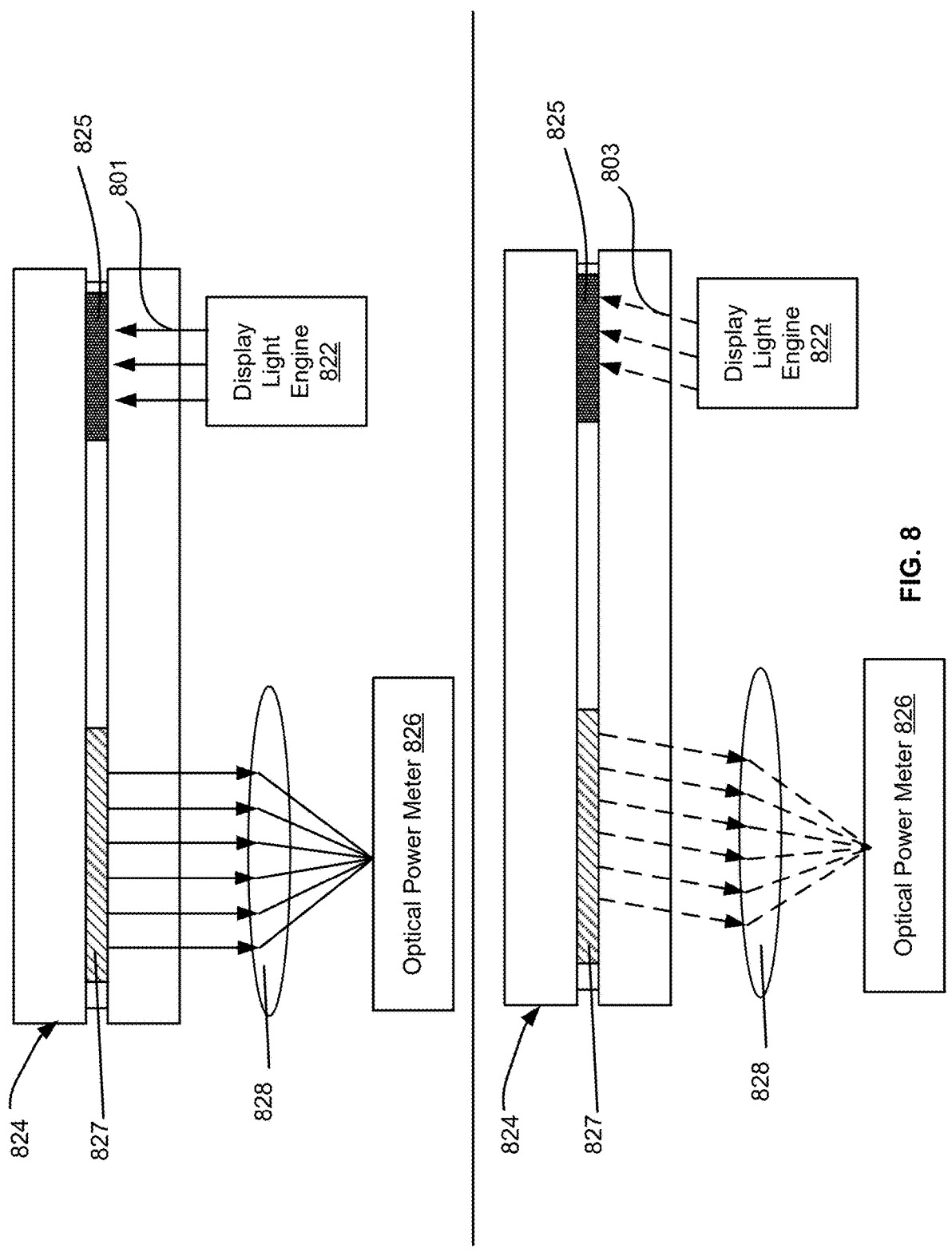
FIG. 8 illustrates an example of a top view of a measurement setup and light emission for waveguide metrology, in accordance with an embodiment of the disclosure.

FIG. 8 illustrates an example of a top view of a measurement setup and light emission for waveguide metrology, in accordance with an embodiment of the disclosure. The top portion of FIG. 8 corresponds to a first time and the bottom portion of FIG. 8 corresponds to a second time. A display light engine 822 is optically coupled to an optical waveguide 824, which is optically coupled to an optical power meter 826. The display light engine 822 can emit light from different pixel groups during the first time and the second time.

In an example, at the first time, the display light engine 822 can emit first light 801 towards an injection holographic layer 825 of the optical waveguide 824. The first light 801 can correspond to light emitted from a first group of pixels of the display light engine 822. The first light 801 can then propagate within the optical waveguide 824 by TIR towards an extraction holographic layer 827 of the optical waveguide 824, where the first light 801 is extracted. The extracted light propagates towards an optical lens 828 that is disposed between the extraction holographic layer 827 and the optical power meter 826. The optical power meter 826 receives the extracted light and generates a measurement (e.g., a power measurement) of the first light 801 that has been extracted.

In an example, at the second time, the display light engine 822 can emit second light 803 towards the injection holographic layer 825. The second light 803 can correspond to light emitted from a second group of pixels of the display light engine 822. The second light 803 can then propagate within the optical waveguide 824 by TIR towards the extraction holographic layer 827, where the second light 803 is extracted. The extracted light propagates towards the optical lens 828 and is received by the optical power meter 826, which generates a measurement (e.g., a power measurement) of the second light 803 that has been extracted.

In an example, once the optical power meter 826 generates measurements for each pixel group of the display light engine 822, a uniformity of light extraction from the optical waveguide 824 can be determined. For example, each pixel group can emit light having a same wavelength. Then, a computer system (e.g., computer system 110 in FIG. 1) can receive the measurements and determine a minimum among the measurements and a maximum among the measurements. The computer system can then determine a value of the uniformity as a ratio of the minimum over the maximum. So, if the minimum is sixty watts and the maximum is one-hundred watts, then the value of the uniformity is determined to be 0.6. The uniformity can be associated with the wavelength, so a similar process can be repeated for other wavelengths to determine a uniformity of light extraction from the optical waveguide 824 for each wavelength.

Figure 9:
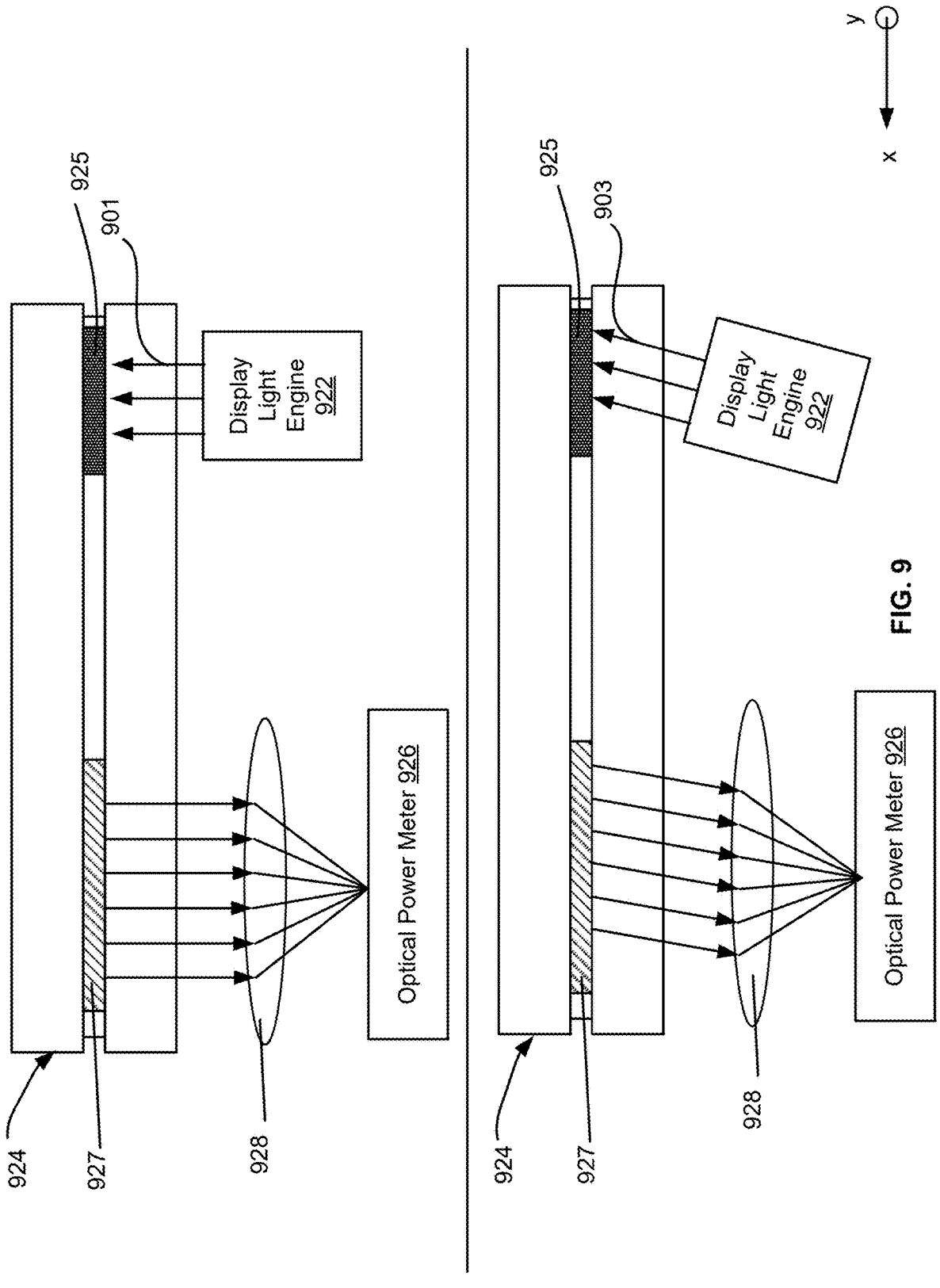
FIG. 9 illustrates an example of a top view of a measurement setup and positioning for waveguide metrology, in accordance with an embodiment of the disclosure.

FIG. 9 illustrates an example of a top view of a measurement setup and positioning for waveguide metrology, in accordance with an embodiment of the disclosure. A display light engine 922 is optically coupled to an optical waveguide 924, which is optically coupled to an optical power meter 926. The top portion of FIG. 9 corresponds to a first position of the display light engine 922 relative to the optical waveguide 924 and the bottom portion of FIG. 9 corresponds to a second position of the display light engine 922 relative to the optical waveguide 924. The display light engine 922 may have a different value for one or more of an x-axis position, a y-axis position, an x-axis rotation, or a y-axis rotation relative to the optical waveguide 924 between the first position and the second position. For instance, in FIG. 9, the display light engine 922 is illustrated as having different values of y-axis rotation in the first position and the second position.

In an example, in the first position, the display light engine 922 can emit first light 901 towards an injection holographic layer 925 of the optical waveguide 924. The first light 901 can correspond to light having a first wavelength that is emitted from a first group of pixels of the display light engine 922. The first light 901 can then propagate within the optical waveguide 924 by TIR towards an extraction holographic layer 927 of the optical waveguide 924, where the first light 901 is extracted. The extracted light propagates towards an optical lens 928 that is disposed between the extraction holographic layer 927 and the optical power meter 926. The optical power meter 926 receives the extracted light and generates a measurement (e.g., a power measurement) of the first light 901 that has been extracted. This process can be repeated for each group of pixels of the display light engine 922 emitting light of the first wavelength such that a measurement is generated for each pixel group of the display light engine 922. Then a computer system (e.g., computer system 110 in FIG. 1) can determine a value of the uniformity of light extraction from the optical waveguide 924, as described in FIG. 8. In addition, the process can be repeated for each wavelength such that a value for the uniformity associated with each wavelength can be determined. The computer system can then generate a combined value (e.g., an average, a weighted sum, etc.) of the uniformity values and associate the combined value with the first position of the display light engine 922 relative to the optical waveguide 924.

In an example, the display light engine 922 can then be repositioned to the second position and each pixel group of the display light engine 922 can emit second light 903 having the first wavelength that is extracted and received by the optical power meter 926. The optical power meter 926 receives the extracted light and generates a measurement (e.g., a power measurement) of the second light 903 that has been extracted. Again, this process can be repeated for each group of pixels of the display light engine 922 emitting light of the first wavelength such that a measurement is generated for each pixel group of the display light engine 922. Then a computer system (e.g., computer system 110 in FIG. 1) can determine a value of the uniformity of light extraction from the optical waveguide 924. In addition, the process can be repeated for each wavelength such that a value for the uniformity associated with each wavelength can be determined. The computer system can then generate a combined value (e.g., an average, a weighted sum, etc.) of the uniformity values and associate the combined value with the second position of the display light engine 922 relative to the optical waveguide 924. To determine a metrology measurement characterizing an alignment of the optical waveguide 924 and the display light engine 922, the computer system can compare the combined value for the first position with combined value for the second position. The optimal alignment for the display light engine 922 can be the position associated with the highest combined value. So, the computer system can determine which combined value is highest and set a value of the alignment of the optical waveguide 924 and the display light engine 922 to the corresponding position.

Figure 10:
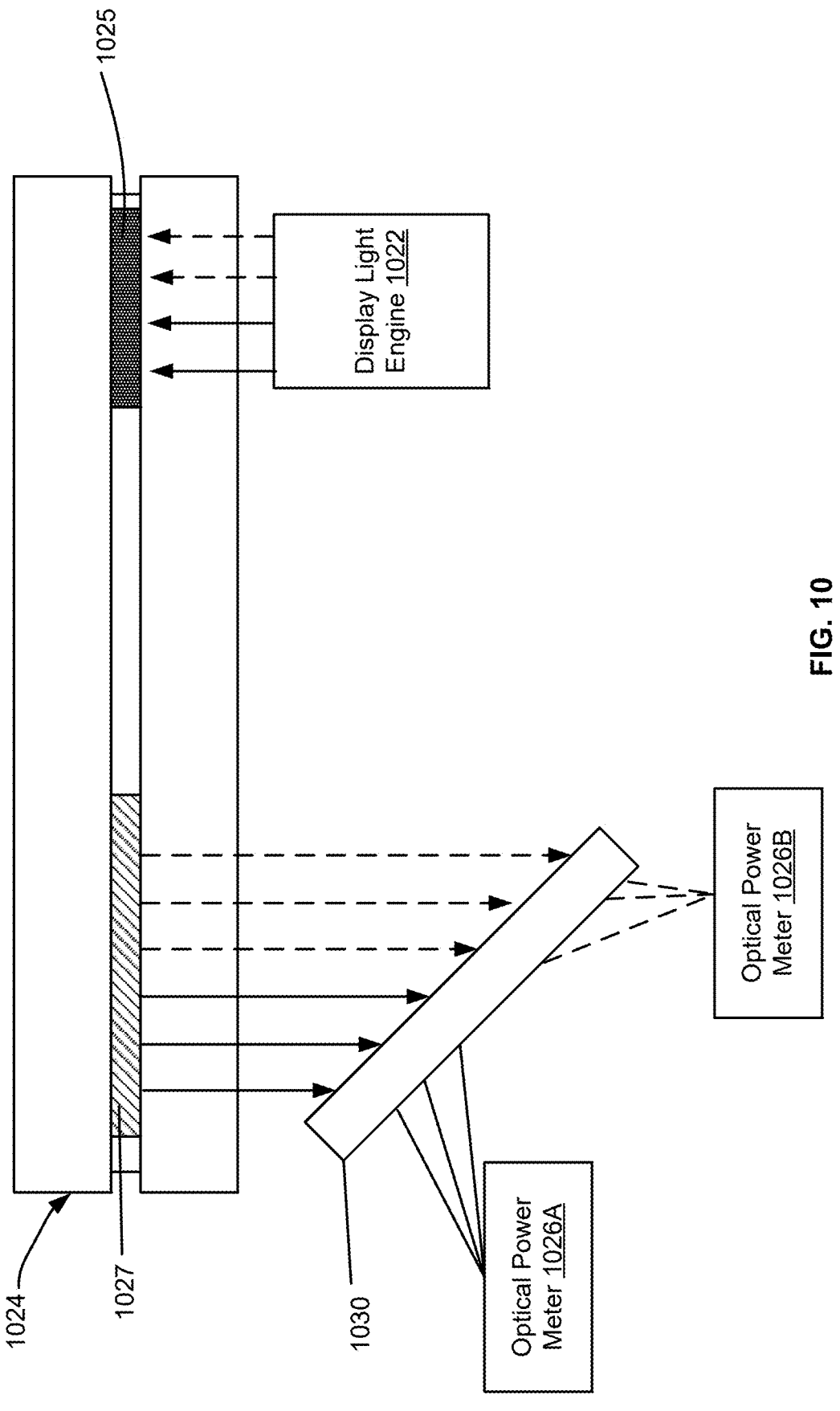
FIG. 10 illustrates an example of a top view of a measurement setup including a beam splitter for waveguide metrology, in accordance with an embodiment of the disclosure.

FIG. 10 illustrates an example of a top view of a measurement setup including a beam splitter 1030 for waveguide metrology, in accordance with an embodiment of the disclosure. A display light engine 1022 is optically coupled to an optical waveguide 1024, which is optically coupled to the beam splitter 1030. The display light engine 1022 can emit first light (shown as solid lines) having a first wavelength and second light (shown as dashed lines) having a second wavelength at the same time towards an injection holographic layer 1025 of the optical waveguide 1024. The first light and the second light can then propagate within the optical waveguide 1024 by TIR towards an extraction holographic layer 1027 of the optical waveguide 1024, where the first light and the second light are extracted. Light extracted from the extraction holographic layer 1027, which includes the first light and the second light, is directed towards the beam splitter 1030. The beam splitter 1030 can include dichroic mirrors (e.g., implemented as thin film filters, such as by being applied as a coating on the output side of a substrate of the beam splitter 1030. The beam splitter 1030 can direct the first light toward an optical power meter 1026A and the second light towards an optical power meter 1026B. The optical power meter 1026A can generate a measurement of the first light and the optical power meter 1026B can generate a measurement of the second light. The measurements can be used to generate a metrology measurement indicating a property of the optical waveguide 1024.

Figure 11:
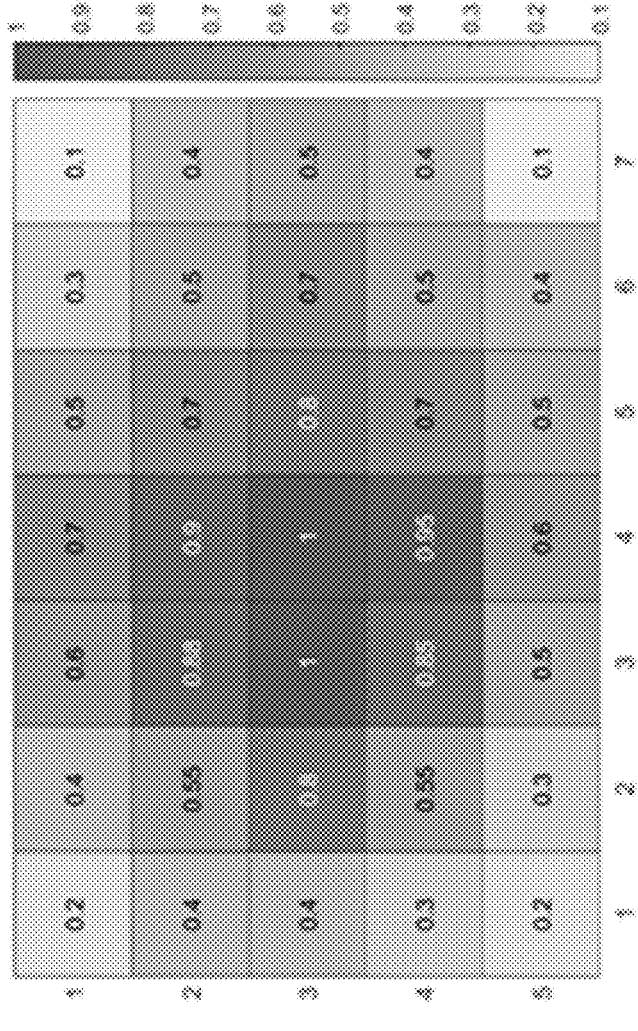
FIG. 11 illustrates an example of a chart showing efficiency of an optical waveguide, according to an embodiment of the disclosure.

FIG. 11 illustrates an example of a chart showing efficiency of an optical waveguide, according to an embodiment of the disclosure. For a group of pixels of a display light engine (e.g., display light engine 122 in FIG. 1), an efficiency value of an optical waveguide (e.g., optical waveguide 124 in FIG. 1) can be determined based on a measurement of the output power of light extracted from the optical waveguide. The efficiency value can be a ratio of the output power to input power the input power of the light emitted by the group of pixels. Each set of pixels, or frame, corresponds to a specific field of view (FOV) angle which is equivalent to a point on the generated image. The point can be predefined based on display sections of the display light engine. The aggregate of the measurements results in a heatmap of the FOV uniformity. Based on the heatmap, the uniformity for the optical waveguide can be determined by determining a ratio of the minimum efficiency value over the maximum efficiency value. In the example of FIG. 11, the minimum efficiency value is 0.1 and the maximum efficiency value is one, so the uniformity for the optical waveguide is determined to be 0.1.

In an example, a threshold can be set to determine an FOV associated with the optical waveguide. A display section associated with a measurement above the threshold can be considered to be in the FOV. Otherwise, the display section is determined to be out of the FOV. So, if the threshold for FIG. 11 is 0.6, twelve of the thirty five display sections are determined to be in the FOV. In addition, there can be a FOV per color channel, or a FOV for across the color channels (e.g., by combining their uniformity measurements into a single measurement that can be thresholded).

Figure 12:
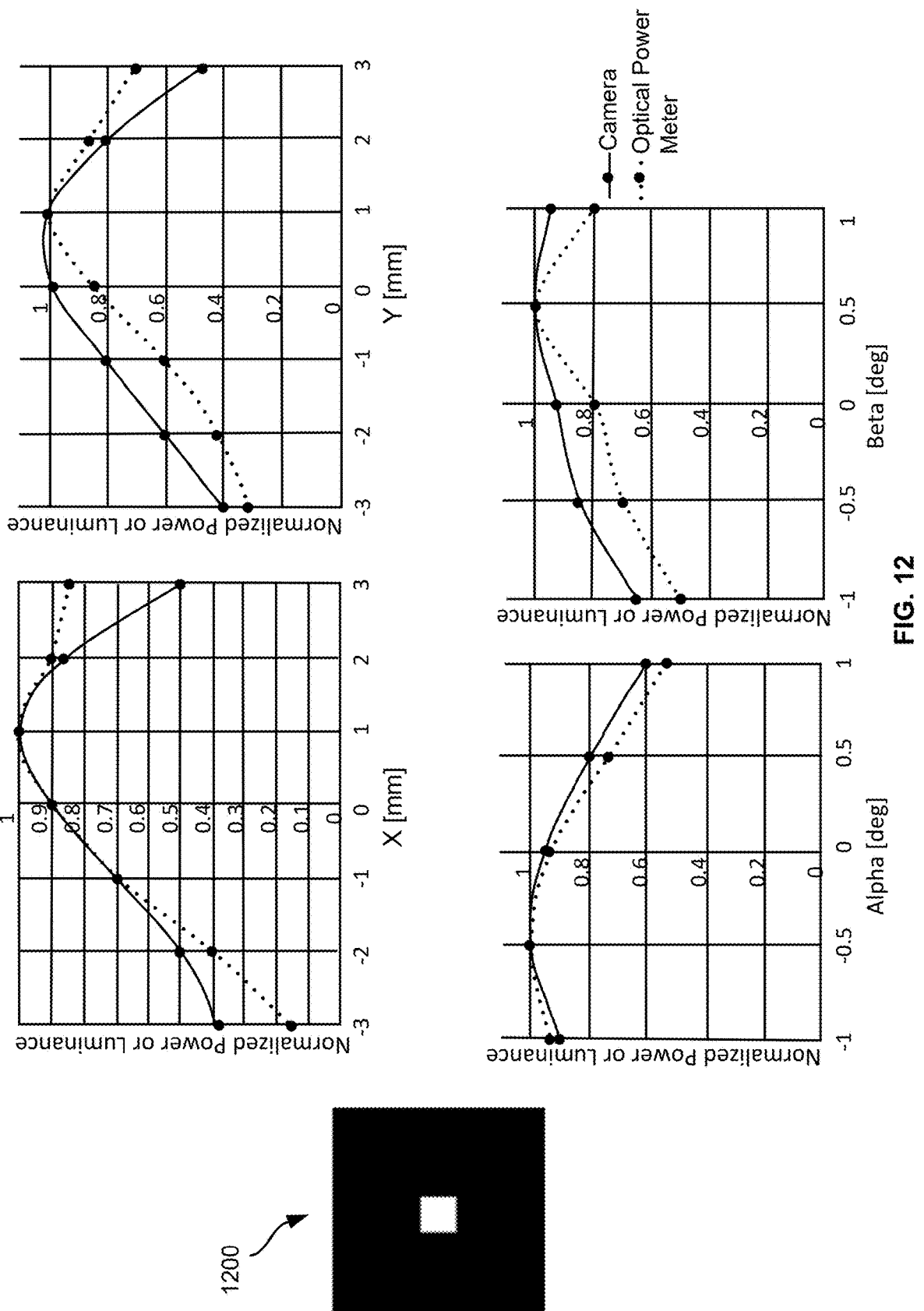
FIG. 12 illustrates example results of comparing a camera to a display light engine for determining an alignment of a display light engine relative to an optical waveguide, in accordance with an embodiment of the disclosure.

FIG. 12 illustrates example results of comparing a camera to a display light engine for determining an alignment of a display light engine relative to an optical waveguide, in accordance with an embodiment of the disclosure. The results are generated for an input image 1200, representing a group of pixels at the center of the display light engine. The results show how power or luminance is affected by various position space parameters of x, y, a, and β of the display light engine. Based on the results, an optimal alignment position can be found using the optical power meter and the camera. The two approaches suggest the same optimal alignment position and are in good agreement. For instance, the optimal alignment position is illustrated as being an x-position of one mm, a y-position of one mm, an x-rotation (a) of-0.5 degrees, and a y-rotation (β) of 0.5 degrees.

FIGS. 13-16 illustrate example flows for processes related to augmented reality waveguide and display light engine metrology, in accordance with embodiments of the disclosure. In some embodiments, the processes may be performed by a computer system described herein (e.g., computer system 110 of FIG. 1). The processes (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Some or all of the processes (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 13:
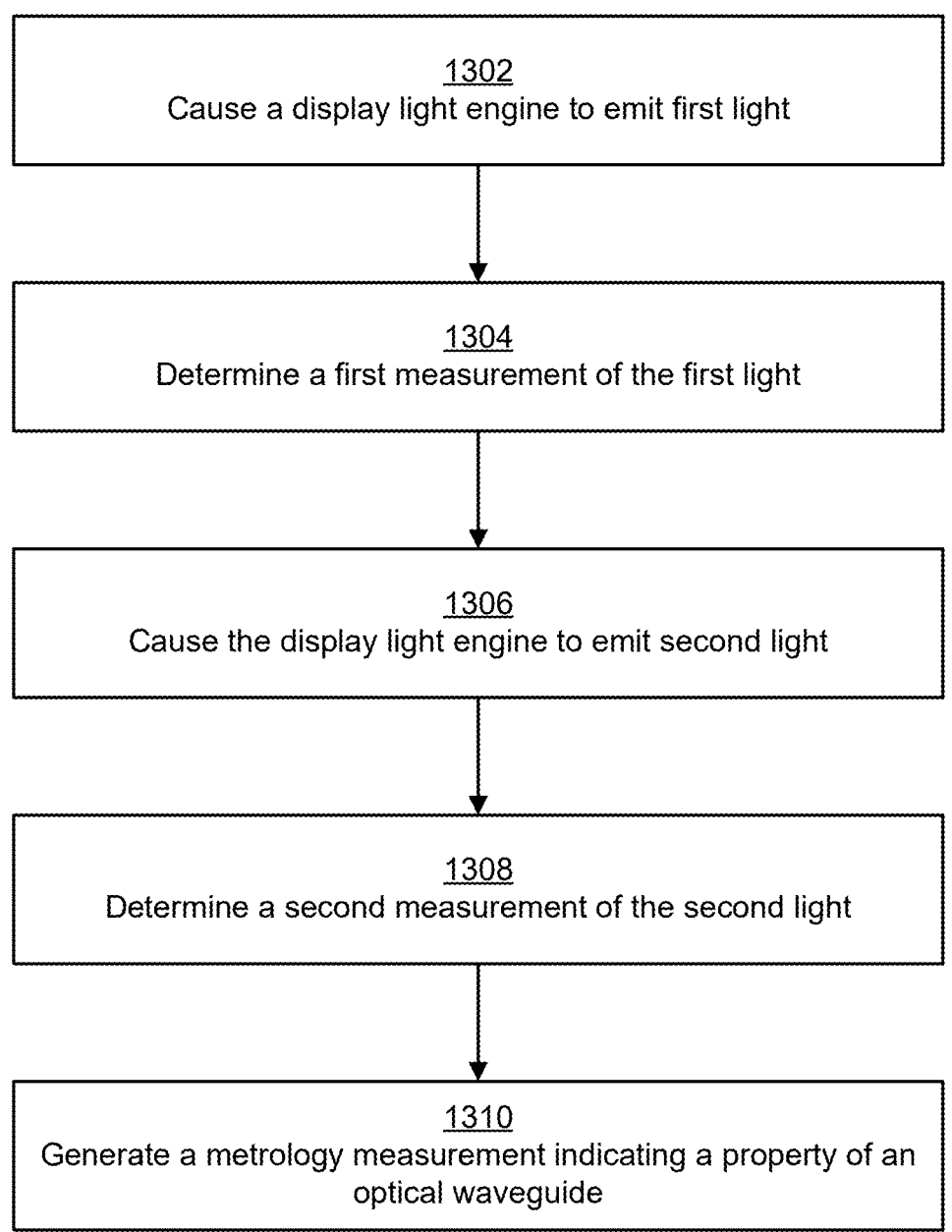
FIG. 13 illustrates an example of a flow for using a display light engine an optical waveguide for metrology measurements, in accordance with an embodiment of the disclosure.

FIG. 13 illustrates an example of a flow for using a display light engine an optical waveguide for metrology measurements, in accordance with an embodiment of the disclosure. In an example, the flow includes operation 1302, where the computer system causes a display light engine (e.g., display light engine 122 in FIG. 1) to emit first light. The first light can have a first wavelength and be emitted at a first time. The display light engine can emit the first light from a first group of pixels of the display light engine.

In an example, the flow includes operation 1304, where the computer system determines a first measurement of the first light. The first measurement is determined after the first light is extracted from an optical waveguide (e.g., optical waveguide 124 in FIG. 1). The first measurement may be a power measurement or a luminance measurement made by an optical power meter.

In an example, the flow includes operation 1306, where the computer system causes the display light engine to emit second light. The second light can have a same or different wavelength than the first wavelength and can be emitted at the first time or a second time. The display light engine can emit the second light from a second group of pixels of the display light engine that is different from the first group.

In an example, the flow includes operation 1308, where the computer system determines a second measurement of the second light. The second measurement is determined after the second light is extracted from the optical waveguide. The second measurement may be a power measurement or a luminance measurement made by the optical power meter.

In an example, the flow includes operation 1310, where the computer system generates a metrology measurement indicating a property of the optical waveguide. The metrology measurement is based on the first measurement and the second measurement and indicates a property of the optical waveguide. For instance, the property may be a uniformity of light extraction from the optical waveguide or an alignment of the optical waveguide and the display light engine.

Figure 14:
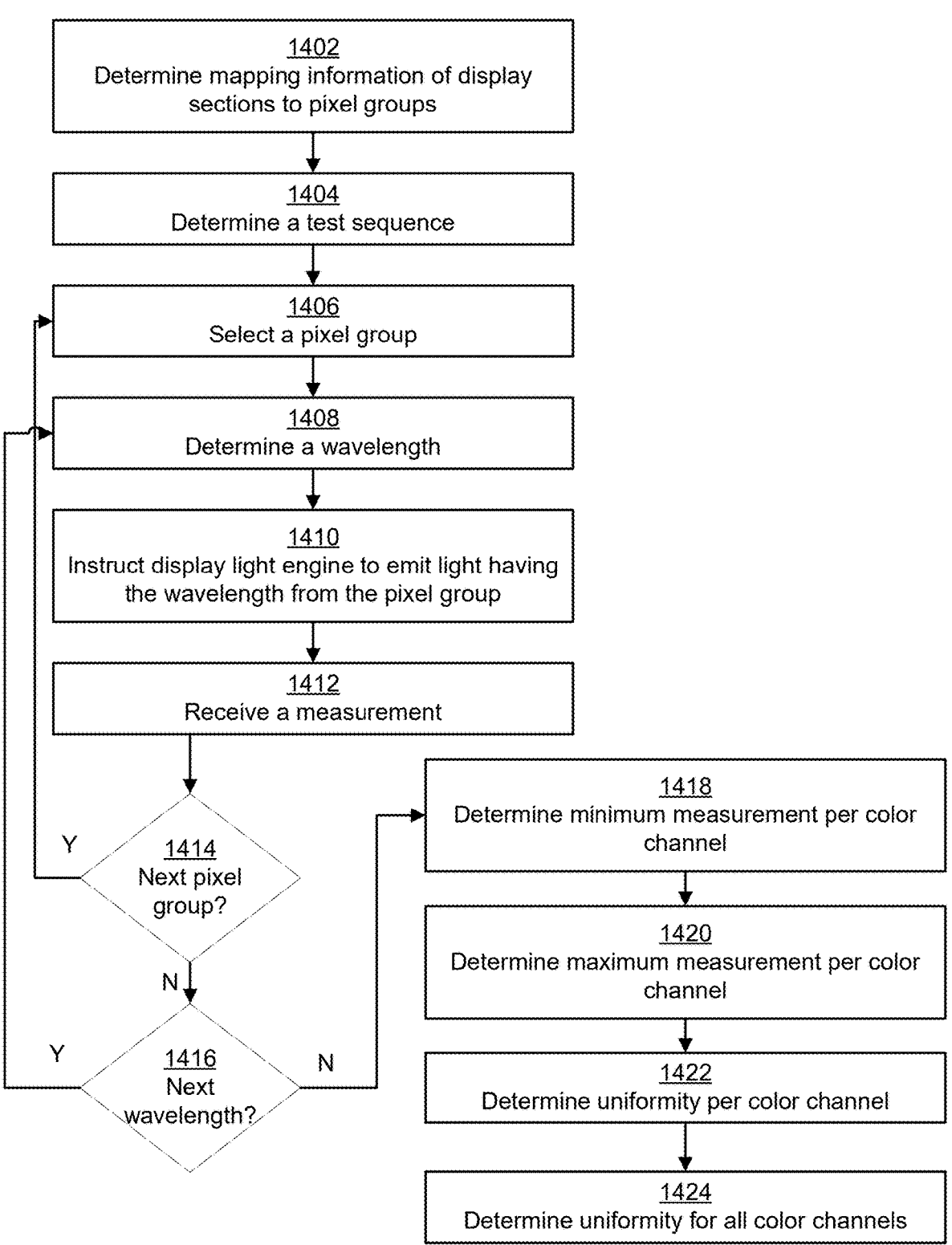
FIG. 14 illustrates an example flow for determining uniformity of light extraction from an optical waveguide, in accordance with an embodiment of the disclosure.

FIG. 14 illustrates an example flow for determining uniformity of light extraction from an optical waveguide, in accordance with an embodiment of the disclosure. In an example, the flow includes operation 1402, where the computer system determines mapping information of display sections to pixel groups. A display light engine (e.g., display light engine 122 in FIG. 1) can include display sections. Each display section is associated with a pixel group that is configured to emit light. The computer system can determine pixels of the display light engine that are associated with each pixel group and display section. The mapping information can indicate associations between display sections and pixel groups.

In an example, the flow includes operation 1404, where the computer system determines a test sequence. The test sequence can include a series of steps for a test involving the display light engine and a corresponding optical waveguide. For instance, the test sequence can indicate wavelengths that are to be used, whether pixel groups are to emit light in parallel or sequentially, the sequence of pixel groups that are to emit light, etc.

In an example, the flow includes operation 1406, where the computer system selects a pixel group. The pixel group can be selected based on being indicated in the test sequence as a first pixel group that is to emit light. For instance, the pixel group may be a top left pixel group of the display light engine.

In an example, the flow includes operation 1408, where the computer system determines a wavelength. The wavelength can be determined based on the test sequence indicating that the pixel group is to emit light having the wavelength.

In an example, the flow includes operation 1410, where the computer system instructs the display light engine to emit light having the wavelength from the pixel group. The display light engine is then caused to emit the light from the pixel group. The light is received by, propagated within, and then extracted by the optical waveguide.

In an example, the flow includes operation 1412, where the computer system receives a measurement. The measurement is determined by an optical power meter that is optically coupled to the optical waveguide. The measurement is determined after the light is extracted from the optical waveguide and can correspond to a power measurement of the extracted light. In an example, the flow includes operation 1414, where the computer system determines whether there is a next pixel group. The computer system can determine there is a next pixel group or not based on the test sequence. If there is a next pixel group, the flow can return to operation 1406, where the computer system selects another pixel group. Otherwise, the flow proceeds to operation 1416.

In an example, the flow includes operation 1416, where the computer system determines whether there is a next wavelength. The computer system can determine there is a next wavelength or not based on the test sequence. If there is a next wavelength, the flow can return to operation 1408, where the computer system determines another wavelength. Otherwise, the flow proceeds to operation 1418.

In an example, the flow includes operation 1418, where the computer system determines a minimum measurement per color channel. Each color channel can correspond to a wavelength used during the test sequence. So, for each measurement received for a given wavelength, the computer system can determine which measurement is the minimum.

In an example, the flow includes operation 1420, where the computer system determines a maximum uniformity per color channel. The computer system can compare the measurements received for a given wavelength and determine which measurement is the maximum.

In an example, the flow includes operation 1422, where the computer system determines a uniformity per color channel. The uniformity for a color channel can correspond to a ratio of the minimum measurement for the color channel over the maximum measurement for the color channel.

In an example, the flow includes operation 1424, where the computer system determines a uniformity for all color channels. The computer system can combine the uniformities for the color channels to determine the uniformity for all color channels. For instance, the computer system may average or determine a weighted sum of the uniformities of the color channels to determine the uniformity for all color channels.

Figure 15:
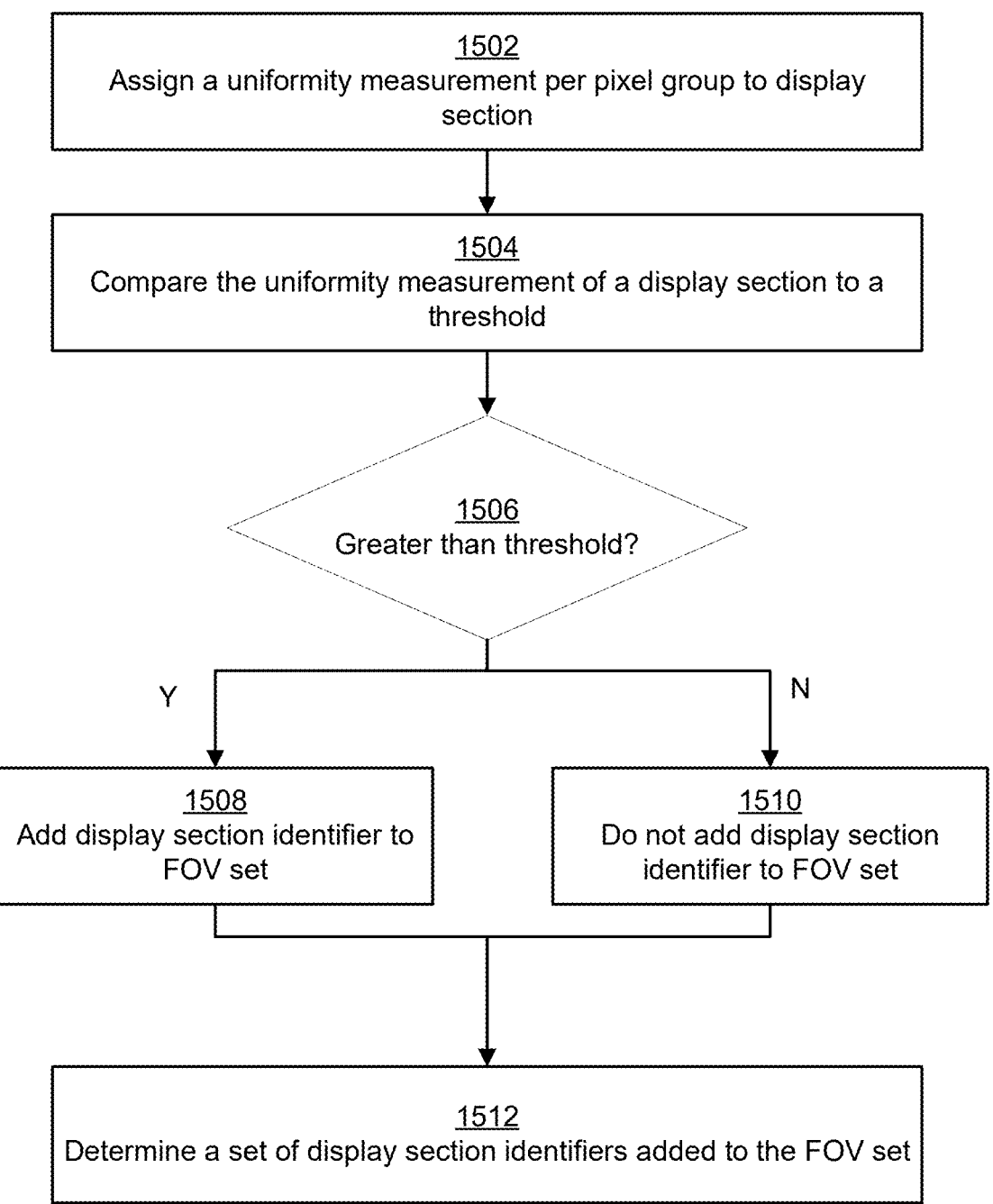
FIG. 15 illustrates an example of a flow for determining a field of view, in accordance with an embodiment of the disclosure.

FIG. 15 illustrates an example of a flow for determining a field of view, in accordance with an embodiment of the disclosure. FIG. 15 is described across all color channels, but the process may alternatively be performed at each color channel level.

In an example, the flow includes operation 1502, where the computer system assigns a uniformity measurement per pixel group to a display section. The uniformity measurement may represent a power measurement associated with a display light engine emitting light from the pixel group into an optical waveguide and measuring a power of the light extracted from the optical waveguide. The power measurement can be associated with a reference point (e.g., center pixel, corner pixel, etc.) of the display section.

In an example, the flow includes operation 1504, where the computer system compares the uniformity measurement of a display section to a threshold. For instance, the uniformity measurement may be 0.4 and the threshold may be 0.5. So, the computer system can determine that the uniformity measurement is below the threshold.

In an example, the flow includes operation 1506, where the computer system determines whether the uniformity measurement is greater than the threshold. If so, the computer system proceeds to operation 1508. Otherwise, the computer system proceeds to operation 1510.

In an example, the flow includes operation 1508, where the computer system adds a display section identifier to an FOV set. The display section identifier corresponds to the display section having the uniformity measurement greater than the threshold. The FOV set corresponds to a set of display sections that make up an FOV. So, adding the display section identifier to the FOV set indicates that that the display section is part of the FOV.

In an example, the flow includes operation 1510, where the computer system does not add the display section identifier to the FOV set.

In an example, the flow includes operation 1512, where the computer system determines a set of display section identifiers added to the FOV set. The computer system can then determine the FOV of the display light engine and optical waveguide based on the display section identifiers.

Figure 16:
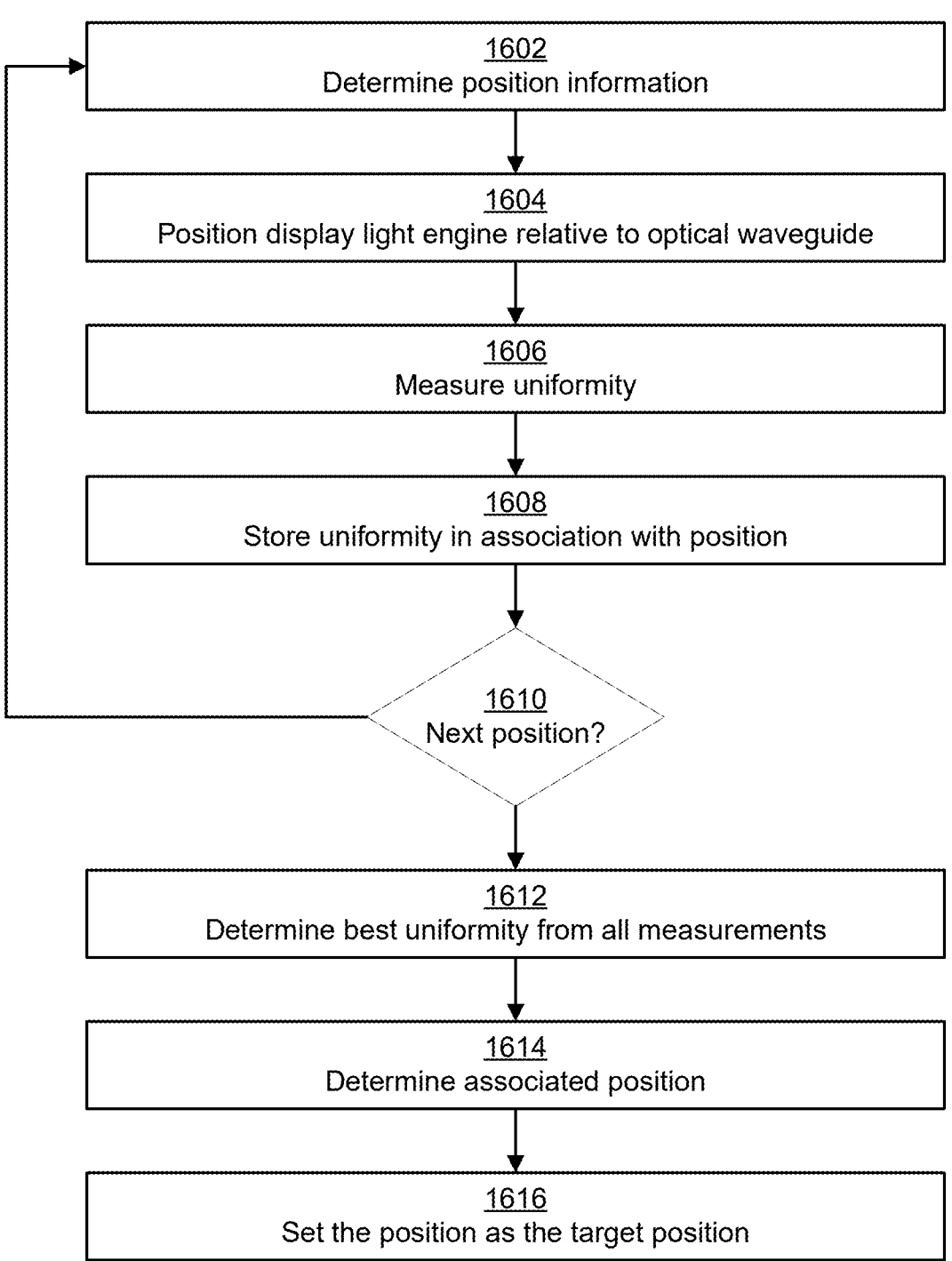
FIG. 16 illustrates an example of a flow for determining an alignment of a display light engine relative to an optical waveguide, in accordance with an embodiment of the disclosure.

FIG. 16 illustrates an example of a flow for determining an alignment of a display light engine relative to an optical waveguide, in accordance with an embodiment of the disclosure.

FIG. 16 is described across all color channels, but the process may alternatively be performed at each color channel level.

In an example, the flow includes operation 1602, where the computer system determines position information. The computer system can determine the position information from a test sequence that indicates measurements are to be taken for particular of x, y, a, and β values for a display light engine relative to an optical waveguide.

In an example, the flow includes operation 1604, where the computer system positions the display light engine relative to the optical waveguide. The computer system can instruct a fixture or the display light operation to move the display light engine and/or the optical waveguide so that the display light engine is positioned according to the position information.

In an example, the flow includes operation 1606, where the computer system measures a uniformity of light extraction for the optical waveguide. The computer system can follow the process in FIG. 14 to determine the uniformity.

In an example, the flow includes operation 1608, where the computer system stores the uniformity in association with the position. The computer system may store a position identifier in association with the uniformity. The position identifier may also be associated with the position information for the position.

In an example, the flow includes operation 1610, where the computer system determines whether there is a next position. The computer system can determine whether there is a next position based on the test sequence. If there is a next position, the computer system can return to operation 1602. Otherwise, the computer system can proceed to operation 1612.

In an example, the flow includes operation 1612, where the computer system determines a best uniformity from all measurements. The computer system can compare the uniformities for each position and determine which is the highest. The highest uniformity can be determined to be the best.

In an example, the flow includes operation 1614, where the computer system determines an associated position. The computer system can lookup which position identifier is associated with the best uniformity to determine the position associated with the best uniformity.

The position associated with the best uniformity can correspond to an optimal alignment between the display light engine and the optical waveguide.

In an example, the flow includes operation 1616, where the computer system sets the position as the target position. Accordingly, the target position corresponds to the optimal alignment.

Figure 17:
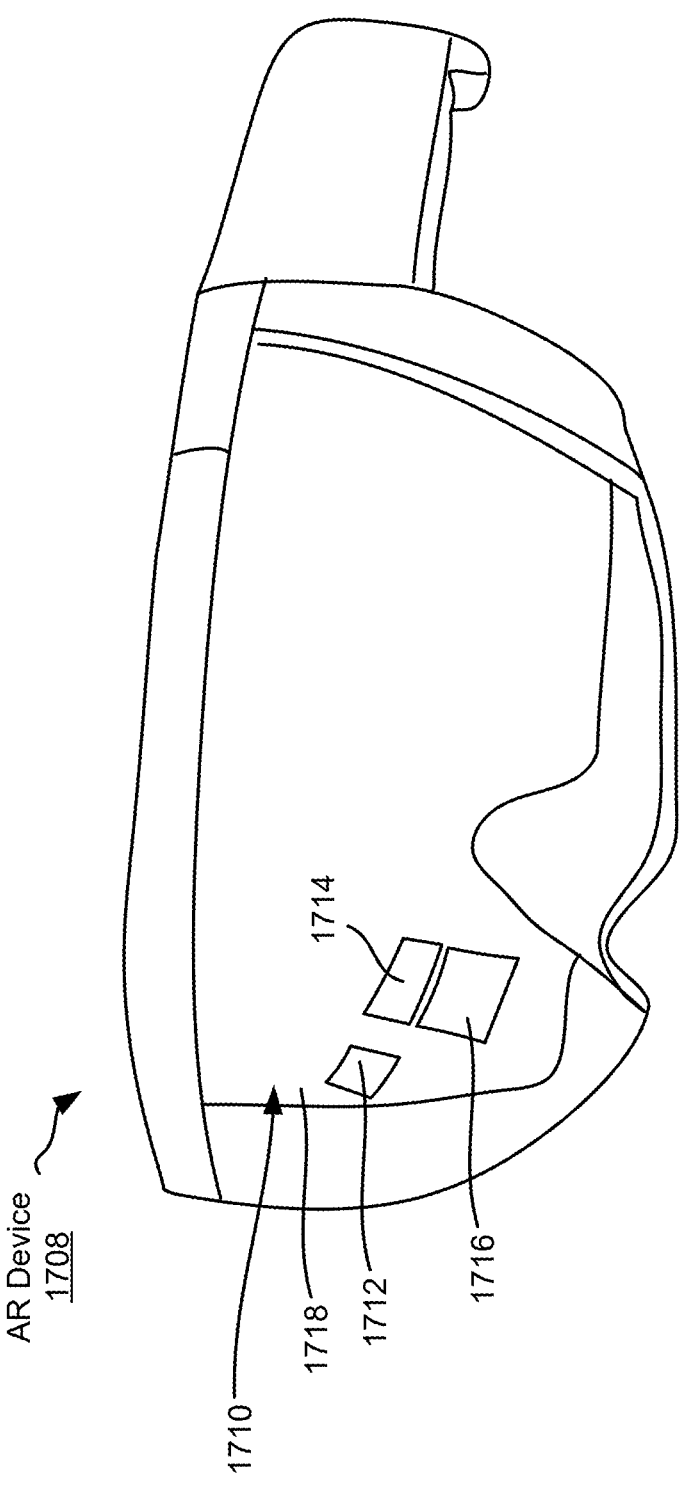
FIG. 17 illustrates an example of a mixed reality device that implements an optical waveguide with multiple holographic layers in accordance with an embodiment of the disclosure.

FIG. 17 illustrates an example of a mixed reality device that implements an optical waveguide with multiple holographic layers in accordance with an embodiment of the disclosure. In the example of FIG. 17, the mixed reality device is illustrated as an augmented reality (AR) device 108. However, other types of mixed reality devices are likewise possible, such as heads up displays (HUDs), holographic devices, and the like. Generally, a mixed reality device enables combining images from different sources via an optical waveguide combiner. One source can be the real world, whereby these images are real-world images. Another source can be a virtual world, whereby these images are virtual (or digital) images. A waveguide combiner projects virtual images and allow a viewer to see through the real world for AR and heads-up display (HUD) applications. The waveguide combiner offers the possibility to extend the eye box without sacrificing the field of view. The eye box is the region where the viewer sees the image, and the field of view is the angular extent (size) of the image.

Referring to FIG. 17, the AR device 1708 (e.g., its optical combiner) can combine the real-world images with the virtual images. The real world images can be perceived through a see-through lens of the AR device 1708. The virtual images can be formed based on light emission from a light projector.

The AR device 1708 may include an optical waveguide system 1710. The optical waveguide system 1710 (or at least the optical waveguide) can span the entirety of a face shield of the AR device 1708 or a portion thereof. In an example, the optical waveguide system 1710 includes an optical waveguide substrate 1718 that propagates a light beam between a light injection surface and a light extraction surface. Although not illustrated in FIG. 17, the optical waveguide substrate 1718 can be optically coupled to a display light engine, where this display light engine can be positioned according to metrology measurements of the present disclosure.

In an example, the optical waveguide system 1710 includes an injection holographic layer 1712 coupled to the light injection surface. The injection holographic layer 1712 can receive the light beam from a light engine along a light projection axis and diffract the light beam into the optical waveguide substrate 1718. The light beam can propagate within the optical waveguide substrate 1718 by TIR along a first direction until reaching a redirection holographic layer 1714 that is coupled to the optical waveguide substrate 1718. The redirection holographic layer 1714 can redirect the light beam along a second direction, different from the first direction, towards the light extraction surface as a redirected light beam. The light beam can continue propagating within the optical waveguide substrate 1718 by total internal reflection until reaching an extraction holographic layer 1716 that is coupled to the light extraction surface and extracts the light beam from the optical waveguide substrate 1718 as an output light beam. The output light beam can represent an image.

Figure 18:
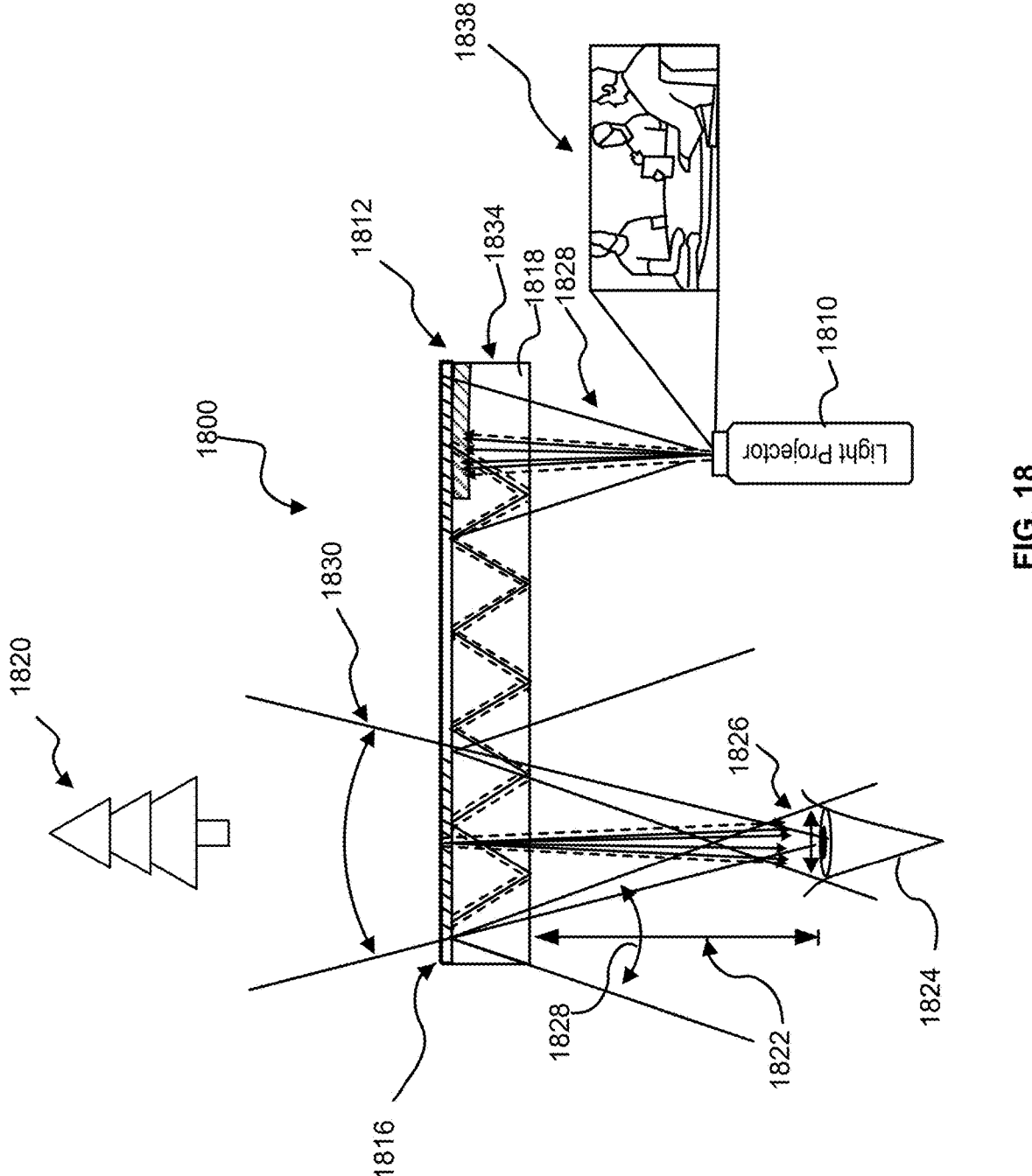
FIG. 18 illustrates a schematic of a system of a waveguide combiner in accordance with an embodiment of the present disclosure.

FIG. 18 illustrates a schematic of a system of an optical lens set and image combiner in accordance with an embodiment of the present disclosure. An optical system 1800 can be used in mixed reality display, such as a heads-up display or an augmented reality display. The optical system 1800 includes an optical combiner 1834. Pupil replication decouples the pupil size from the field of view, which are otherwise inversely linked in other types of mixed reality systems. This advantage means that the optical combiner based displays can offer a large eye box together with a large image field of view. In an example, the optical combiner

1834 may be a waveguide optical combiner. Nonetheless, other optical combiner types are possible, such as a holographic optical element-based combiner, or any other suitable optical combiner, in other examples.

Pupil replication in the optical combiner 1834 can be obtained when the image that is propagating inside the optical combiner 1834 is only partially extracted (or redirected) the optical combiner 1834. When this happens, the remainder of the light keeps propagating in its original direction inside the optical combiner 1834. The remaining light bounces on the outer surface of the optical combiner 1834 and then interacts again with the holographic optical element, where another portion is extracted (or redirected). Successive extractions of the light replicate the pupil multiple times.

The optical combiner 1834 can be built using waveguide holography. This technique uses an injection hologram 1812 to trap auxiliary content 1838 (e.g., projector-emitted light representing virtual images) inside a substrate 1818 through TIR. The auxiliary content 1838 can be generated by a light projector 1810 (e.g., a light engine configured as a light source). In the substrate 1818, the auxiliary content 1838 propagates away from the light projector 1810 and is out-coupled toward a viewer's eye 1824 by an extraction hologram 1816. A hologram represents a functional diffractive structure that transforms the waveform of the input beam into an output beam. A volume holographic element (VHOE) is a type of hologram that operates in the Bragg diffraction regime. The optical combiner 1834 represents the optical elements in the optical path from the exit aperture of the light projector 1810 to the plane where light enters the viewer's eye 1824. Both the injection hologram 1812 and the extraction hologram 1816 are transparent across the entire or a predefined visible range except for a percent reduction (depending on different parameters such as the type materials used, thickness, etc.) in transmission across the bandwidth of the broadband red-green-blue (RGB) light sources. This allows the viewer to see real imagery 1820 and the auxiliary content 1838. The light projector 1810 and the extraction hologram 1816 emit within a cone of light 1828.

Although FIG. 18 illustrates the injection hologram 1812 and the extraction hologram 1816 to be on a same side of the substrate 1818, embodiments of the present disclosure are not limited as such. For instance, the injection hologram 1812 and the extraction hologram 1816 can be on opposite sides of the substrate 1818. Generally, the injection hologram 1812 is coupled to an input surface of the substrate 1818 by, for instance, being mounted to and attached to the input surface. Likewise, the extraction hologram 1816 is coupled to an output surface of the substrate 1818 by, for instance, being mounted to and attached to the output surface. The input surface corresponds to a surface where light from the light projector 1810 is received. The output surface corresponds to a surface from which light is emitted from the substrate 1818.

The optical combiner 1834 can form the eye box 1826 in the horizontal and vertical directions. The eye box 1826 can correspond to the vertical and horizontal distance where the viewer's pupil receives all the angles emitted by the light projector 1810. As the viewer's pupil moves outside the eye box 1826, the image becomes degraded. Eye relief 1822 is the distance between the substrate surface and the entrance pupil of the viewer's eye 1824. For maximum comfort, this distance should be larger than a minimum threshold distance. The field-of-view 1830 is the angular size of the image determined by the geometric relationship between the size of the extraction hologram 1816 and the distance between the pupil and the surface of the extraction hologram 1816.

Waveguide combiners using holographic optical elements can operate in either a transmission mode where the light is diffracted as it passes through the holographic optical element or in a reflection mode where the light is diffracted and returns in the opposite direction after striking the holographic optical element. Such waveguide combiners can be used in near-to-eye (NTE) systems to achieve a particular field of view. Field of view angles can be measured in air and acceptance angles for reflection volume holographic optical element are measured inside the substrate. The relationship between the air and substrate angles is described by Snell's law.

Holographic optical elements operating in reflection mode can be volume holographic optical elements. A reflection volume holographic optical element is capable of in-coupling into substrate modes (light propagating through total internal reflection).

A properly designed optical combiner 1834 can have a high transmission (e.g., at least 80%) of the light from the real imagery 1820, a large auxiliary field of view diagonally, vertically and horizontally, a large eye box, and an ability to accept the auxiliary content 1838 from broadband light emitting diode RGB inputs. To build such an optical waveguide combiner, several issues can be addressed.

Light projectors are designed to achieve a certain white balance (the ratio between the primary emission wavelengths that provide a natural looking image-white balance is typically expressed in degrees Kelvin of a black body source producing the same spectral distribution). The optical combiner 1834 maintains the white balance of the light projector 1810 along the optical path to the viewer's eye 1824.

While either transmission or reflection holographic optical element can be implemented in the display to produce a large field of view, reflection holographic optical elements can provide a large horizontal field of view. Transmission holographic optical elements can be used in the optical combiner 1834 when the angular requirements on the field of views are smaller. Both horizontal and vertical field of views can be limited by the distance from the aperture stop of the light projector 1810 to the center of the extraction hologram 1816. In order for NTE glasses to accommodate size, weight, and power restrictions, the size of the light projector 1810 should be as small as possible. In some designs, this makes the size of the aperture stop (pupil) as small as five mm in diameter in relation to the desired vertical field of view. In this case, the limitation on vertical field of view can become significant and would need to be expanded. Pupil expansion in the horizontal direction is naturally provided by the waveguide geometry of the optical combiner 1834. This is because the light forming the image experiences multiple bounces in the direction of the extraction hologram 1816 and multiple light extractions can expand the eye box 1826. In particular, a portion of the light can be extracted and output by each of the diffraction gratings of the extraction hologram 1816.

The arrangement of components of the optical system 1800 is provided for illustrative purposes. Different possible of such components are possible. For example, the eye box 1826 can be centered, positioned near center, or positioned at a particular distance from the center of the optical combiner 1834.

Figure 19:
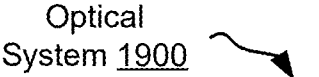
FIG. 19 illustrates a schematic diagram of an optical system in accordance with an embodiment of the present disclosure.
Figure 19:
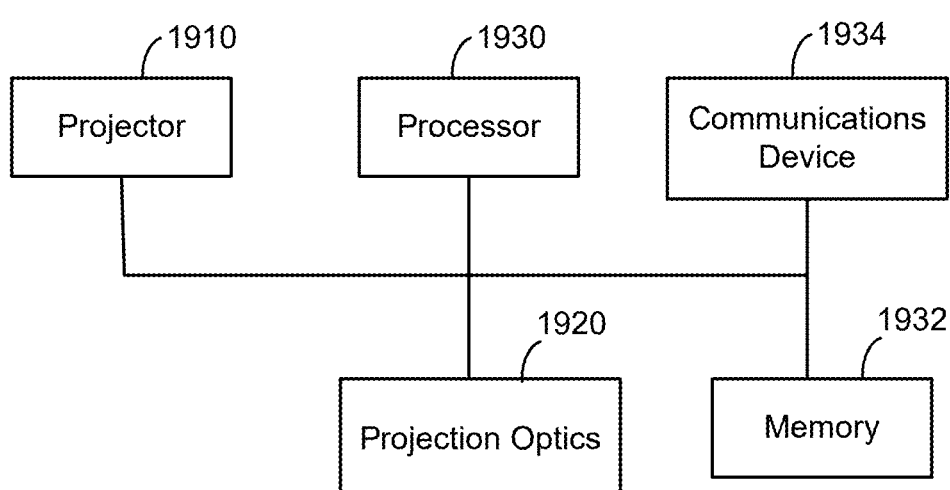

FIG. 19 illustrates a schematic diagram of an optical system 1900 system in accordance with an embodiment of the present disclosure. As illustrated in FIG. 19, the optical system 1900 supports a mixed reality device, such as any of the devices described herein above. In an example, the optical system 1900 includes a projector 1910, which can be implemented as discussed in relation to the light projectors discussed herein above. The optical system 1900 includes an optical waveguide system including holographic layers. The optical system 1900 can also include projection optics 1920 operable to direct light produced using projector 1910. The optical system 1900 additionally includes a processor 1930 (e.g., a microprocessor), a memory 1932, and a communications device 1934. The memory 1932, also referred to as storage media or non-transitory computer readable storage media, stores computer-readable instructions of an application, where the computer-readable instructions are executable by the processor 1930 to run the application.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or network browser. It should be appreciated that alternate embodiments may have numerous variations from that described above. For example, customized hardware might also be used and/or particular elements might be implemented in hardware, software (including mobile software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a mobile computing device, a device controller, or a computational engine within an appliance, to name a few.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including,"

and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:
an optical power meter;
one or more processors; and
one or more memory storing instructions that, upon execution by the one or more processors, cause the one or more processors to:
cause a display light engine to emit, at a first time, first light from a first group of pixels of the display light engine toward an injection holographic layer of an optical waveguide;
receive, from the optical power meter, a first power measurement value associated with the first light after the first light is extracted from an extraction holographic layer of the optical waveguide, wherein the first light propagates from the injection holographic layer to the extraction holographic layer;
cause the display light engine to emit, at a second time, second light from a second group of pixels of the display light engine toward the injection holographic layer, the second group being different from the first group, the first light and the second light having a same wavelength;
receive, from the optical power meter, a second power measurement value associated with the second light after the second light is extracted from the extraction holographic layer; and
generate, based at least in part on the first power measurement value and the second power measurement value, a metrology measurement indicating a property of the optical waveguide, the property including at least one of a uniformity of light extraction from the optical waveguide or an alignment of the optical waveguide and the display light engine.

2. The system of claim 1, wherein the first and the second group of pixels are part of a plurality of groups of pixels, and wherein the one or more memory store further instructions that, upon execution by the one or more processors, configure the one or more processors to:
determine information that maps each group of pixels of the plurality of groups of pixels to a corresponding display section of the display light engine;
determine that the first power measurement value is a minimum value among a plurality of power measurement values;
determine that the second power measurement value is a maximum value among the plurality of power measurement values; and
determine a value of the uniformity as a ratio of the first power measurement value and the second power measurement value.

3. The system of claim 1, wherein the first power measurement value and the second power measurement value are generated while the display light engine is at a first position relative to the optical waveguide, and wherein the one or more memory store further instructions that, upon execution by the one or more processors, configure the one or more processors to:
generate a first value for the uniformity based at least in part on the first power measurement value and the second power measurement value;
generate a second value for the uniformity based at least in part on a plurality of power measurement values that are received from the optical power meter while the display light engine is at the first position, wherein each one of the plurality of power measurement values corresponds to a different group of pixels of the display light engine and is associated with light emissions using a wavelength different from the wavelength of the first light and the second light;
generate a first combined value of the first value and the second value;
associate the first combined value with the first position;
determine that the first combined value is larger than a second combined value associated with a second position of the display light engine relative to the optical waveguide; and
set a value of the alignment to the first position.

4. A method comprising:
causing a display light engine to emit first light from a first group of pixels of the display light engine, the display light engine optically coupled to an injection holographic layer of an optical waveguide;
determining a first measurement value associated with the first light after the first light is extracted from the optical waveguide, the first measurement value determined by at least being received from an optical power meter that is optically coupled to an extraction holographic layer of the optical waveguide;

causing the display light engine to emit second light from a second group of pixels of the display light engine, the second group being different from the first group;

determining a second measurement value associated with the second light after the second light is extracted from the optical waveguide; and generating, based at least in part on the first measurement value and the second measurement value, a metrology measurement indicating a property of the optical waveguide.

5. The method of claim 4, wherein causing the display light engine to emit the first light comprises causing the display light engine to emit, at a first time, the first light having a first wavelength, and wherein causing the display light engine to emit the second light comprises causing the display light engine to emit, at a second time, the second light having the first wavelength.

6. The method of claim 5, wherein the metrology measurement is a first metrology measurement, and wherein the method further comprises:

causing the display light engine to emit, at a third time, third light from the first group of pixels, the third light having a second wavelength different than the first wavelength;

determining a third measurement value associated with the third light after the third light is extracted from the optical waveguide; and generating a second metrology measurement based at least in part on the third measurement value.

7. The method of claim 4, wherein causing the display light engine to emit the first light comprises causing the display light engine to emit, at a first time, the first light having a first wavelength and wherein causing the display light engine to emit the second light comprises causing the display light engine to emit, at the first time, the second light having a second wavelength different from the first wavelength.

8. The method of claim 4, wherein the first light and the second light have a first wavelength, the method further comprising:

determining, a third measurement value associated with third light emitted using a third group of pixels of the display light engine, extracted from the optical waveguide, and having the first wavelength, wherein the first light, the second light, and the third light are emitted at different times by the display light engine; and determining, based at least in part on the first measurement value, the second measurement value, and the third measurement value, a first uniformity associated with light extraction from the optical waveguide.

9. The method of claim 8 further comprising:

determining a fourth measurement value associated with fourth light emitted using the first group of pixels, extracted from the optical waveguide, and having a second wavelength, the fourth light and the first light emitted at different times; and determining, based at least in part on the fourth measurement value, a second uniformity associated with the light extraction from the optical waveguide.

10. The method of claim 4, wherein the first measurement value and the second measurement value are associated with a first position of the display light engine relative to the optical waveguide, and wherein the method further comprises:

determining a first uniformity associated with light extraction from the optical waveguide based at least in part on the first measurement value and the second measurement value;

associating the first position with the first uniformity; and determining a second uniformity associated with the light extraction by repeating, for a second position of the display light engine relative to the optical waveguide, measurements for the light extraction.

11. The method of claim 4, further comprising:

determining a third measurement value associated with third light emitted using a third group of pixels, extracted from the optical waveguide, and having a second wavelength, the third group of pixels corresponding to a different section of the display light engine than the first group of pixels and the second group of pixels, the third light emitted at a same time or a different time than the first light;

determining a first uniformity associated light extraction from the optical waveguide based at least in part on the first measurement value and the second measurement value; and determining a second uniformity associated with the light extraction based at least in part on the third measurement value.

12. A system comprising:

one or more processors; and one or more memory storing instructions that, upon execution by the one or more processors, cause the one or more processors to:

cause a display light engine to emit, at a first time, first light from a first group of pixels of the display light engine, the first light having a first wavelength;

determine a first measurement value associated with the first light after the first light is extracted from an optical waveguide;

cause the display light engine to emit, at the first time, second light from a second group of pixels of the display light engine, the second group being different from the first group, the second light having a second wavelength different from the first wavelength;

determine a second measurement value associated with the second light after the second light is extracted from the optical waveguide; and generate, based at least in part on the first measurement value and the second measurement value, a metrology measurement indicating a property of the optical waveguide.

13. The system of claim 12 further comprising:

an optical power meter, wherein the optical power meter is optically coupled to an extraction holographic layer of the optical waveguide and is configured to generate the first measurement value and the second measurement value, and wherein the display light engine is coupled to an injection holographic layer of the optical waveguide and is configured to emit the first light and the second light.

14. The system of claim 13 further comprising:

an optical lens disposed between an extraction holographic layer and the optical power meter, wherein a focal point of the optical lens is on a surface of the optical power meter.

15. The system of claim 12 further comprising:

a first optical power meter;

a second optical power meter; and a beam splitter, wherein:

the first light has a first wavelength, the second light has a second wavelength, the first light and the second light are emitted at the same time, light extracted from the optical waveguide comprises the first light and the second light and is directed toward the beam splitter, the beam splitter is configured to direct the first light toward the first optical power meter and the second light toward the second optical power meter, the first optical power meter is configured to generate the first measurement value, and the second optical power meter is configured to generate the second measurement value.

16. The system of claim 12, wherein the first group and the second group belong to a predefined set of pixel groups, wherein a size of the predefined set is based at least in part on a test resolution associated with generating the metrology measurement.

17. The system of claim 12 further comprising:

an optical power meter configured to generate the first measurement value, wherein a size of the first group is based at least in part on a sensitivity of the optical power meter.

18. The system of claim 12 further comprising:

a photodetector configured to generate the first measurement value; and a photopic filter optically coupled to the photodetector, wherein the first measurement value indicates a luminance measurement of the first light.

19. The system of claim 12, wherein the first group and the second group are either non-overlapping with a pitch between the first group and the second group or are partially overlapping, and wherein each of the first group and the second group is associated with a different non-overlapping display section of the display light engine.

20. The system of claim 12, wherein the first measurement value comprises is determined by at least receiving the first measurement value from an optical power meter, wherein the optical power meter is optically coupled to an extraction holographic layer of the optical waveguide and the display light engine is optically coupled to an injection holographic layer of the optical waveguide.

* * * * *